US012811783B2

(12) United States Patent
Rosario

(10) Patent No.: US 12,811,783 B2
(45) Date of Patent: Nov. 24, 2026

(54) BLOCKCHAIN ADDRESS APPLICATION USER INFORMATION MANAGEMENT

(71) Applicant: Coinbase, Inc., Oakland, CA (US)

(72) Inventor: Lukas Rosario, New York City, NY (US)

( * ) Notice: Subject to any disclaimer, the term of this patent is extended or adjusted under 35 U.S.C. 154(b) by 42 days.

(21) Appl. No.: 18/968,978

(22) Filed: Dec. 4, 2024

(65) Prior Publication Data

US 2026/0155965 A1 Jun. 4, 2026

(51) Int. Cl.

| | |
|---|---|
| ***H04L 9/08*** | (2006.01) |
| ***H04L 9/00*** | (2022.01) |
| ***H04L 9/32*** | (2006.01) |

(52) U.S. Cl.

CPC .......... *H04L 9/0869* (2013.01); *H04L 9/3239* (2013.01); *H04L 9/3247* (2013.01); *H04L 9/3271* (2013.01); *H04L 9/50* (2022.05)

(58) Field of Classification Search

CPC ................ H04L 9/0869; H04L 9/3247; H04L 9/3271; H04L 9/50; H04L 9/3239

USPC ........................................................ 713/176

See application file for complete search history.

(56) References Cited

U.S. PATENT DOCUMENTS

| | | | |
|---|---|---|---|
| 2020/0005292 A1 | 1/2020 | Mao et al. | |
| 2023/0010786 A1 * | 1/2023 | Korwin-Gajkowski .................... | G06F 21/6245 |
| 2024/0303637 A1 | 9/2024 | Cohler et al. | |

FOREIGN PATENT DOCUMENTS

| | | | | |
|---|---|---|---|---|
| EP | 3629516 A1 | * | 4/2020 | .......... H04L 9/0869 |
| KR | 20210103615 A | * | 8/2021 | ......... G06Q 20/3825 |

OTHER PUBLICATIONS

Cappalli et al. "Web Authentication: An API for Accessing Public Key Credentials Level 3", Nov. 14, 2024, 246 pages (Year: 2024).*

English Translation of Kim reference KR20210103615 A, 2021, 14 pages (Year: 2021).*

English Translation of Schroder et al. reference EP 3629516 A1, Published Apr. 1, 2020, 11 pages (Year: 2020).*

Reed et al. "Decentralized Identifiers (DIDs) v1.0", W3C Working Draft, Jul. 13, 2020, 113 pages (Year: 2020).*

(Continued)

*Primary Examiner* — James D Nigh

(74) *Attorney, Agent, or Firm* — Holland & Hart LLP

(57) ABSTRACT

Methods, systems, and devices for data management are described. An application may receive a request message including a payload for signature by a blockchain address and indicating requested information to be provided to a collection endpoint associated with a client application. The application may receive the information and encrypt the information using a cryptographic key generated based on a passkey associated with a user. A smart contract may store the encrypted information mapped to the blockchain address that is associated with the passkey. The application may obtain the encrypted information from the smart contract and decrypt the information using the cryptographic key. The application may broadcast, after receiving a user input executing the signature, messages to a blockchain network and configured to execute an operation on the blockchain network and transmit, using the collection endpoint, a response message including the requested information and an identifier of the operation.

20 Claims, 11 Drawing Sheets

(56) References Cited

OTHER PUBLICATIONS

Ahmed et al. "A Self-Sovereign Identity Architecture Based on the Blockchain and the Utilization of Customer's Banking Cards", 2020 15th International Conference on Computer Engineering and Systems, Mar. 21, 2021, 8 pages (Year: 2021).*

Cappalli et al., Web Authentication: An API for accessing Public Key Credentials Level 3, Jan. 22, 2025 [retrieved on Jan. 27, 2025] Retrieved from the Internet: URL: https://w3c.github.io/webauthn/#prf-extension, 260 pages.

* cited by examiner

BLOCKCHAIN ADDRESS APPLICATION USER INFORMATION MANAGEMENT

FIELD OF TECHNOLOGY

The present disclosure relates generally to data management, including techniques for blockchain address application user information management.

BACKGROUND

Blockchains and related technologies may be employed to support recordation of ownership of digital assets, such as cryptocurrencies, fungible tokens, non-fungible tokens (NFTs), and the like. Generally, peer-to-peer networks support transaction validation and recordation of transfer of such digital assets on blockchains. Various types of consensus mechanisms may be implemented by the peer-to-peer networks to confirm transactions and to add blocks of transactions to the blockchain networks. Example consensus mechanisms include the proof-of-work consensus mechanism implemented by the Bitcoin network and the proof-of-stake mechanism implemented by the Ethereum network. Some nodes of a blockchain network may be associated with a digital asset exchange, which may be accessed by users to trade digital assets or trade a fiat currency for a digital asset.

DETAILED DESCRIPTION

Blockchain applications, including client applications and blockchain address applications, may allow users having blockchain addresses to perform operations on a blockchain network without revealing personal information. However, in some examples, operations on a blockchain network may be associated with use of user information. As an example, a client application may allow customers to purchase physical goods, such as t-shirts, using crypto tokens and with blockchain addresses. In such examples, the client application may request some user information, including a shipping address, in order to provide the physical good to the user. In some other examples, client applications may trigger one or more operations based on checking some user information. As an example, client applications may check (e.g., receive and verify) user information before performing an operation, such as providing a rebate for a purchase, providing access to a service, or the like. Techniques described herein support secure exchange and secure storage of user information in association with operations on a blockchain network.

A blockchain address application may receive requests for user information from different client applications (e.g., merchants). The requests for user information may be included in transaction requests. That is, the requests for user information may be in association with operations on a blockchain network. Additionally, the requests for user information may indicate a collection endpoint where the information is to be provided. For example, the blockchain address application may provide the information to the endpoint associated with the client application after the transaction is broadcast via a blockchain network. If the blockchain address application previously received the user information, the blockchain address application may automatically fill in requested user information by retrieving the user information from a database or from a smart contract where user information is stored in an encrypted form. When the user information is stored at the smart contract, the user information may be encrypted using a cryptographic key generated by the blockchain address application using an output of a pseudo-random function (PRF) that is associated with a credential of the user (e.g., a passkey). The blockchain address application may decrypt the user information using the cryptographic key and provide the requested user information to the collection endpoint. Additionally, the blockchain address application may obtain a signature and execute the operation on the blockchain network.

Figure 1:
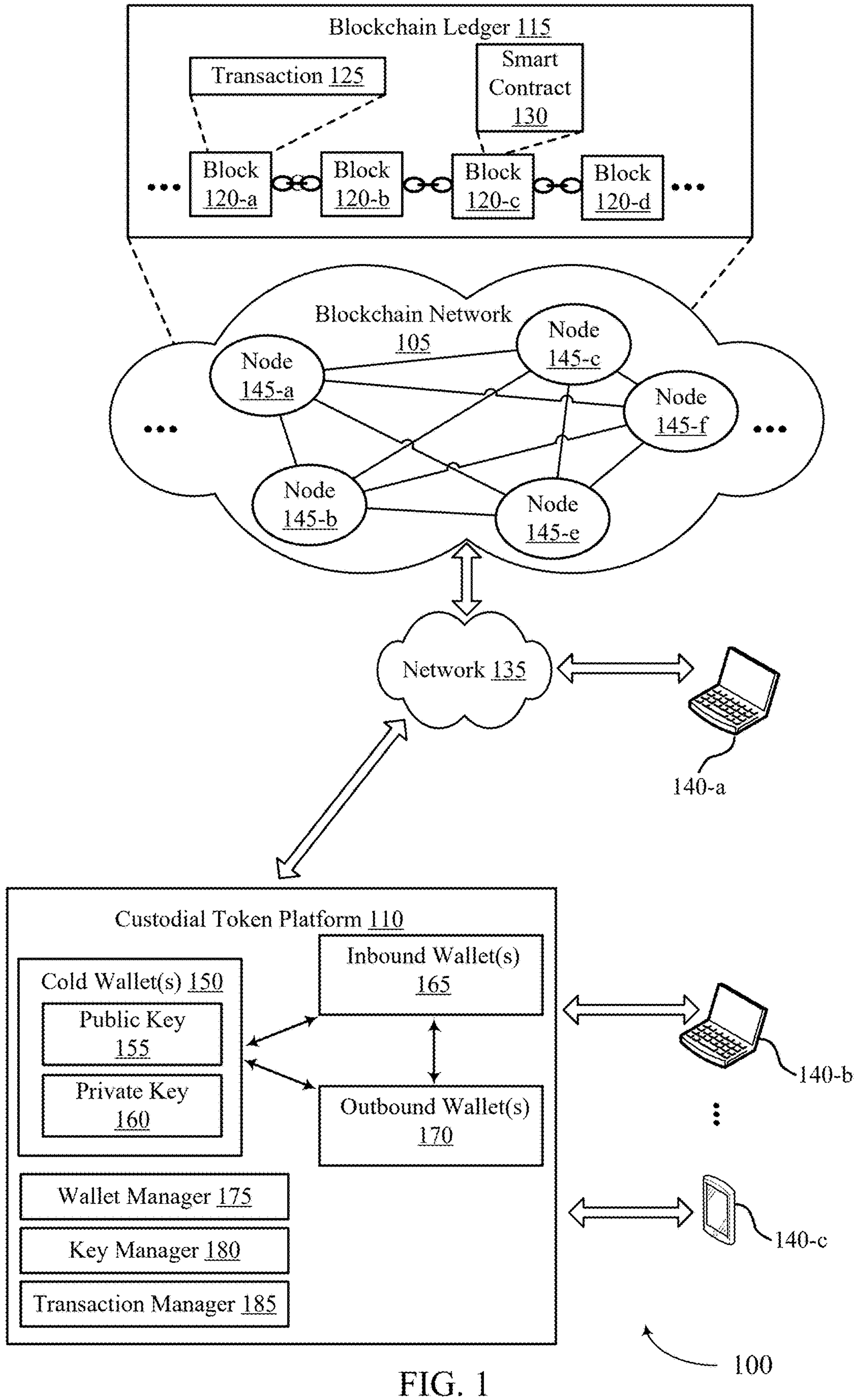
FIGS. 1 and 2 illustrate examples of computing environments that support blockchain address application user information management in accordance with aspects of the present disclosure.

FIG. 1 illustrates an example of a computing environment 100 that supports blockchain address application user information management in accordance with aspects of the present disclosure. The computing environment 100 may include a blockchain network 105 that supports a blockchain ledger 115, a custodial token platform 110, and one or more computing devices 140, which may be in communication with one another via a network 135.

The network 135 may allow the one or more computing devices 140, one or more nodes 145 of the blockchain network 105, and the custodial token platform 110 to communicate (e.g., exchange information) with one another. The network 135 may include aspects of one or more wired networks (e.g., the Internet), one or more wireless networks (e.g., cellular networks), or any combination thereof. The network 135 may include aspects of one or more public networks or private networks, as well as secured or unsecured networks, or any combination thereof. The network 135 also may include any quantity of communications links and any quantity of hubs, bridges, routers, switches, ports or other physical or logical network components.

Nodes 145 of the blockchain network 105 may generate, store, process, verify, or otherwise use data of the blockchain ledger 115. The nodes 145 of the blockchain network 105 may represent or be examples of computing systems or devices that implement or execute a blockchain application or program for peer-to-peer transaction and program execution. For example, the nodes 145 of the blockchain network 105 support recording of ownership of digital assets, such as cryptocurrencies, fungible tokens, NFTs, and the like, and changes in ownership of the digital assets. The digital assets may be referred to as tokens, coins, crypto tokens, or the like. The nodes 145 may implement one or more types of consensus mechanisms to confirm transactions and to add blocks (e.g., blocks 120-*a*, 120-*b*, 120-*c*, and so forth) of transactions (or other data) to the blockchain ledger 115. Example consensus mechanisms include a proof-of-work consensus mechanism implemented by the Bitcoin network and a proof-of-stake consensus mechanism implemented by the Ethereum network.

When a device (e.g., the computing device 140-*a*, 140-*b*, or 140-*c*) associated with the blockchain network 105 executes or completes a transaction associated with a token supported by the blockchain ledger, the nodes 145 of the blockchain network 105 may execute a transfer instruction that broadcasts the transaction (e.g., data associated with the transaction) to the other nodes 145 of the blockchain network 105, which may execute the blockchain application to verify the transaction and add the transaction to a new block (e.g., the block 120-*d*) of a blockchain ledger (e.g., the blockchain ledger 115) of transactions after verification of the transaction. Using the implemented consensus mechanism, each node 145 may function to support maintaining an accurate blockchain ledger 115 and prevent fraudulent transactions.

The blockchain ledger 115 may include a record of each transaction (e.g., a transaction 125) between wallets (e.g., wallet addresses) associated with the blockchain network 105. Some blockchains may support smart contracts, such as smart contract 130, which may be an example of a sub-program that may be deployed to the blockchain and executed when one or more conditions defined in the smart contract 130 are satisfied. For example, the nodes 145 of the blockchain network 105 may execute one or more instructions of the smart contract 130 after a method or instruction defined in the smart contract 130 is called by another device. In some examples, the blockchain ledger 115 is referred to as a blockchain distributed data store.

A computing device 140 may be used to input information to or receive information from the custodial token platform 110, the blockchain network 105, or both. For example, a user of the computing device 140-*a* may provide user inputs via the computing device 140-*a*, which may result in commands, data, or any combination thereof being communicated via the network 135 to the custodial token platform 110, the blockchain network 105, or both. Additionally, or alternatively, a computing device 140-*a* may output (e.g., display) data or other information received from the custodial token platform 110, the blockchain network 105, or both. A user of a computing device 140-*a* may, for example, use the computing device 140-*a* to interact with one or more user interfaces (e.g., graphical user interfaces (GUIs)) to operate or otherwise interact with the custodial token platform 110, the blockchain network 105, or both.

A computing device 140 and/or a node 145 may be a stationary device (e.g., a desktop computer or access point) or a mobile device (e.g., a laptop computer, tablet computer, or cellular phone). In some examples, a computing device 140 and/or a node 145 may be a commercial computing device, such as a server or collection of servers. And in some examples, a computing device 140 and/or a node 145 may be a virtual device (e.g., a virtual machine).

Some blockchain protocols may have layer two and layer two functionality, and each layer may support or utilize different tokens. Layer one may refer to the underlying main blockchain architecture, and layer one solutions are improvements directly integrated into the codebase of a cryptocurrency's main blockchain. Layer one solutions, on the other hand, are built on top of layer one and may interact with the main blockchain but have their own architecture. Layer two solutions may support offload of processing from the main blockchain (layer one) to improve scalability and speed while retaining the robust security of the main chain. Additionally, smart contracts implemented on the blockchain networks may support different types of tokens, and the code of the smart contracts may control how tokens are spent, who can spend the tokens, and other conditions for transfer. Additionally, one or more smart contracts may support a decentralized application ("Dapp") that facilitate various types of functionality. Accordingly, various types of tokens may be supported by a blockchain network.

The custodial token platform 110 may support exchange or trading of digital assets, fiat currencies, or both by users of the custodial token platform 110. The custodial token platform 110 may be accessed via website, web application, or applications that are installed on the one or more computing devices 140. The custodial token platform 110 may be configured to interact with one or more types of blockchain networks, such as the blockchain network 105, to support digital asset purchase, exchange, deposit, and withdrawal.

For example, users may create accounts associated with the custodial token platform 110 such as to support purchasing of a digital asset via a fiat currency, selling of a digital asset via fiat currency, or exchanging or trading of digital assets. A key management service (e.g., a key manager) of the custodial token platform 110 may create, manage, or otherwise use private keys that are associated with user wallets and internal wallets. For example, if a user wishes to withdraw a token associated with the user account to an external wallet address, key manager 180 may sign a transaction associated with a wallet of the user, and broadcast the signed transaction to nodes 145 of the blockchain network 105, as described herein. In some examples, a user does not have direct access to a private key associated with a wallet or account supported or managed by the custodial token platform 110. As such, user wallets of the custodial token platform 110 may be referred to non-custodial wallets or non-custodial addresses.

The custodial token platform 110 may create, manage, delete, or otherwise use various types of wallets to support digital asset exchange. For example, the custodial token platform 110 may maintain one or more internal cold wallets 150. The internal cold wallets 150 may be an example of an offline wallet, meaning that the cold wallet 150 is not directly coupled with other computing systems or the network 135 (e.g., at all times). The cold wallet 150 may be used by the custodial token platform 110 to ensure that the custodial token platform 110 is secure from losing assets via hacks or other types of unauthorized access and to ensure that the custodial token platform 110 has enough assets to cover any potential liabilities. The one or more cold wallets 150, as well as other wallets of the blockchain network 105 may be implemented using public key cryptography, such that the cold wallet 150 is associated with a public key 155 and a private key 160. The public key 155 may be used to publicly transact via the cold wallet 150, meaning that another wallet may enter the public key 155 into a transaction such as to move assets from the wallet to the cold wallet 150. The private key 160 may be used to verify (e.g., digitally sign) transactions that are transmitted from the cold wallet 150, and the digital signature may be used by nodes 145 to verify or authenticate the transaction. Other wallets of the custodial token platform 110 and/or the blockchain network 105 may similarly use aspects of public key cryptography.

The custodial token platform 110 may also create, manage, delete, or otherwise use inbound wallets 165 and outbound wallets 170. For example, a wallet manager 175 of the custodial token platform 110 may create a new inbound wallet 165 for each user or account of the custodial token platform 110 or for each inbound transaction (e.g., deposit transaction) for the custodial token platform 110. In some examples, the custodial token platform 110 may implement techniques to move digital assets between wallets of the digital asset exchange platform. Assets may be moved based on a schedule, based on asset thresholds, liquidity requirements, or a combination thereof. In some examples, movements or exchanges of assets internally to the custodial token platform 110 may be "off-chain" meaning that the transactions associated with the movement of the digital asset are not broadcast via the corresponding blockchain network (e.g., blockchain network 105). In such cases, the custodial token platform 110 may maintain an internal accounting (e.g., ledger) of assets that are associated with the various wallets and/or user accounts.

As used herein, a wallet, such as inbound wallets 165 and outbound wallets 170 may be associated with a wallet address, which may be an example of a public key, as described herein. The wallets may be associated with a private key that is used to sign transactions and messages associated with the wallet. A wallet may also be associated with various user interface components and functionality. For example, some wallets may be associated with or leverage functionality for transmitting crypto tokens by allowing a user to enter a transaction amount, a receiver address, etc. into a user interface and clicking or activating a UI component such that the transaction is broadcast via the corresponding blockchain network via a node (e.g., a node 145) associated with the wallet. As used herein, "wallet" and "address" may be used interchangeably.

In some cases, the custodial token platform 110 may implement a transaction manager 185 that supports monitoring of one or more blockchains, such as the blockchain ledger 115, for incoming transactions associated with addresses managed by the custodial token platform 110 and creating and broadcasting on-blockchain transactions when a user or customer sends a digital asset (e.g., a withdrawal). For example, the transaction manager 185 may monitor the addressees of the customers for transfer of layer one or layer two tokens supported by the blockchain ledger 115 to the addresses managed by the custodial token platform 110. As another example, when a user is withdrawing a digital asset, such as a layer one or layer two token, to an external wallet (e.g., an address that is not managed by the custodial token platform 110 or an address for which the custodial token platform 110 does not have access to the associated private key), the transaction manager 185 may create and broadcast the transaction to one or more other nodes 145 of the blockchain network 105 in accordance with the blockchain application associated with the blockchain network 105. As such, the transaction manager 185, or an associated component of the custodial token platform 110 may function as a node 145 of the blockchain network 105.

As described herein, the custodial token platform may implement and support various wallets including the inbound wallets 165, the outbound wallets 170, and the cold wallets 150. Further, the custodial token platform 110 may implement techniques to maintain and manage balances of the various wallets. In some examples, the balances of the various wallets are configured to support security and liquidity. For example, the custodial token platform 110 may implement transactions that move crypto tokens between the inbound wallets 165 and the outbound wallets 170. These transactions may be referred to as "flush" transactions and may occur on a periodic or scheduled basis.

As described herein, various transactions may be broadcast to the blockchain ledger 115 to cause transfer of crypto tokens, to call smart contracts, to deploy smart contracts etc. In some examples, these transactions may also be referred to as messages. That is, the custodial token platform 110 may broadcast a message to the blockchain network 105 to cause transfer of tokens between wallets managed by the custodial token platform 110 to an external wallet, to deploy a smart contract (e.g., a self-executing program), or to call a smart contract.

As described herein, the custodial token platform 110 may support a blockchain address application (e.g., a self-custody blockchain wallet application). The blockchain address application may securely provide and store user information to other applications, such as client applications. For example, the blockchain address application may provide user information to a collection endpoint that is indicated in a request for user information. Additionally, or alternatively, the blockchain address application may store the user information in a smart contract, where the user information is encrypted using an output of a PRF that is associated with a credential of the user (e.g., a passkey).

The request for user information and the indication of the collection endpoint may be included in a transaction request for an operation to be executed on the blockchain network 105. By using an existing message to support communication of the user information, techniques described herein may reduce overhead. For example, the request for user information may be included as an extension (e.g., a "capability") to an existing message (e.g., the transaction request), allowing the message to be expanded to include additional information as necessary. Additionally, storing the user information in an encrypted form at a smart contract may support reduced costs, reduced overhead, and improved security as compared to, as an example, storing user information at a data store. The smart contract may be associated with higher levels of reliability, lower costs, and reduced resources compared to the data store. Additionally, the smart contract may support self-custody of user information. That is, the smart contract is on the blockchain network 105, and only a user having a credential that was used to generate the output of the PRF may be able to decrypt the user information. Accordingly, use of the smart contract may allow users to maintain control over their own information. Thus, utilization of the smart contract supported by the blockchain network 105 may be secure and that the user does not have to rely on a third party to securely store and maintain the user information.

Figure 2:
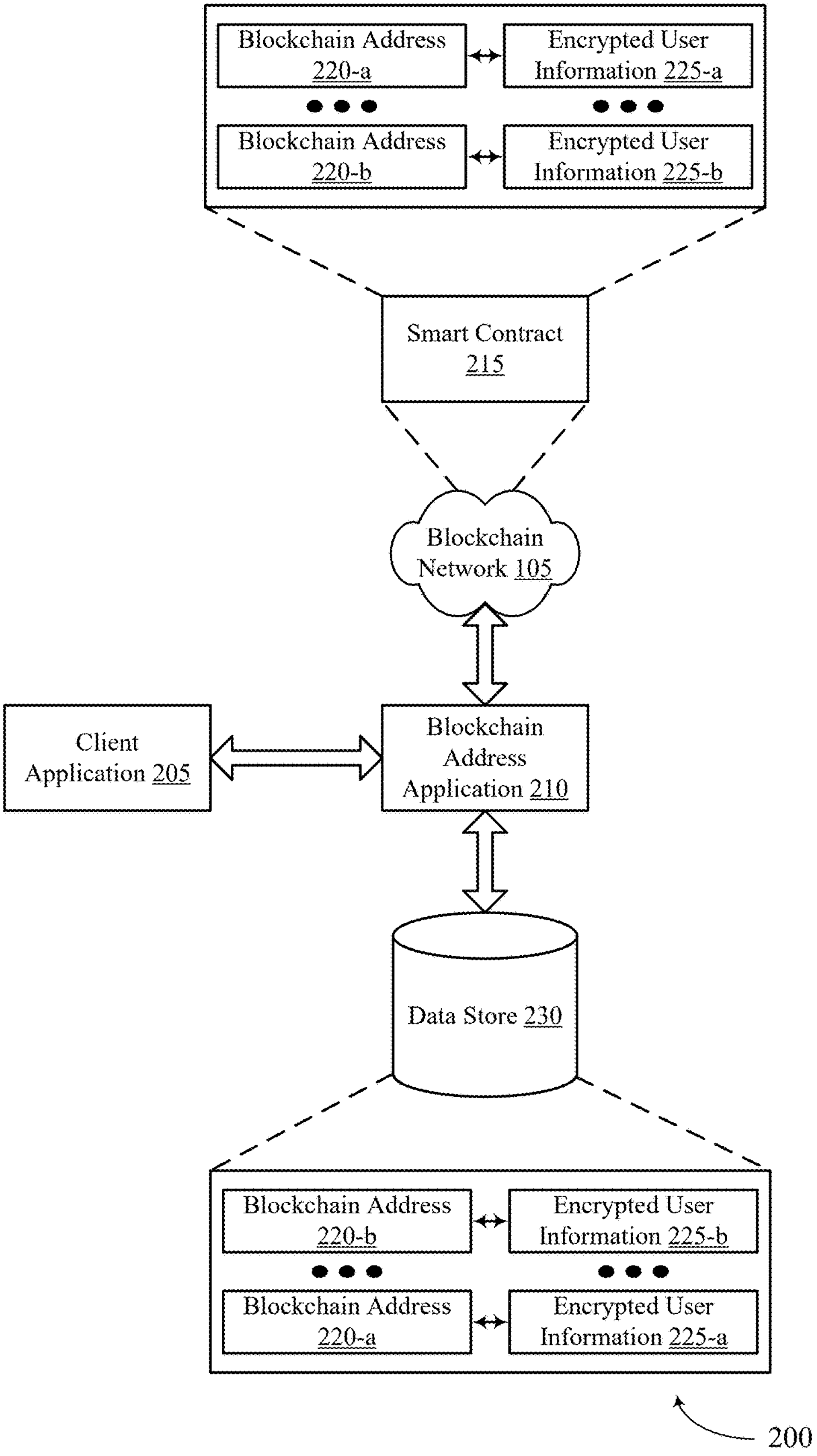

FIG. 2 shows an example of a computing environment 200 that supports blockchain address application user information management in accordance with aspects of the present disclosure. The computing environment 200 may implement or be implemented by aspects of the computing environment 100 as described with reference to FIG. 1. For example, the computing environment 200 may include a blockchain network 105, which may be an example of the blockchain network 105 described with reference to FIG. 1. Additionally, the computing environment 200 may include a client application 205 and a blockchain address application 210. The blockchain address application 210 may be supported by the custodial token platform 110 of FIG. 1 or may be a separate blockchain address application (e.g., blockchain wallet) unassociated with the custodial token platform 110 of FIG. 1. Additionally, or alternatively, the client application 205 may be unassociated with the custodial token platform 110 of FIG. 1 and/or may leverage services supported by the custodial token platform 110 of FIG. 1 to support the techniques described herein. For example, the client application 205 may be unaffiliated with the custodial token platform 110 of FIG. 1 but may utilize a software development kit (SDK) provided by the custodial token platform to support obtaining user information of users that interact with the client application 205. The client application 205 may be an example of a merchant website, a DApp, a Web3 service or website, or any combination thereof. The client application 205 may be accessible by a web-browser of a user device (e.g., a computing device 140 of FIG. 1).

The blockchain address application 210 may support secure storage and exchange of user information. For example, the blockchain address application 210 may provide user information requested by the client application 205 at a secure endpoint that is indicated by a request message. Additionally, the blockchain address application 210 may retrieve the user information from a smart contract 215 of the blockchain network 105 or from a data store 230.

The client application 205 may request user information from the blockchain address application 210. For example, the client application 205 may receive user inputs to perform an operation on the blockchain network 105 involving a blockchain address 220-*a* of the blockchain address application 210. The client application 205 may request, from the blockchain address application 210, a signature by the blockchain address 220-*a* associated with the blockchain address application 210. Additionally, the client application 205 may request user information. For example, the client application 205 may request user information including an email address, a phone number, a shipping address, or the like such that the client application 205 may provide an item or information that is associated with the operation on the blockchain network 105. As an example, a user may purchase, from the client application 205 and using the blockchain address 220-*a*, a physical item (e.g., a t-shirt) that is to be shipped to the user. Accordingly, the client application 205 may request a shipping address to ship the physical item to and an email address or phone number to convey tracking information, an order confirmation, or the like.

To support provision of the user information, a request message from the client application 205 may include a collection endpoint (e.g., a uniform resource locator (URL)) where the user information may be provided. The blockchain address application 210 may retrieve the user information from a smart contract 215 or from a data store 230. For example, the smart contract 215 or the data store 230 may store the user information in an encrypted form. In examples where the user information has not been previously received by the blockchain address application 210 or stored, the blockchain address application 210 may display fields to collect the user information and, after receiving the user information, store the user information in the encrypted form at the smart contract 215 or the data store 230. The blockchain address application 210 may provide, using the collection endpoint, the requested user information along with an identifier (e.g., a transaction hash) of the operation on the blockchain network 105.

In some examples, the smart contract 215, the data store 230, or both may store a mapping of blockchain addresses to encrypted user information. For example, the mapping may include a blockchain address 220-*a* corresponding to encrypted user information 225-*a*, a blockchain address 220-*b* corresponding to encrypted user information 225-*b*, and so on. While two examples of stored mappings are shown in the example of FIG. 2, it may be understood that the smart contract 215 and the data store 230 may store one or more mappings of blockchain addresses to respective sets of user information. Thus, when the client application 205 requests user information (e.g., via the capability) in associated with an operation on a blockchain network, the blockchain address application 210 may be configured request the user information from either the smart contract 215 or the data store 230 using the blockchain address. If the user information is not available from the smart contract 215 or the data store 230, then the blockchain address application 210 may display fields for the user to enter the requested user information. In some cases, the data store 230 may be supported by a service or entity (e.g., custodial token platform 110 of FIG. 1) that supports the blockchain address application 210 such as to allow the blockchain address application 210 to obtain the information. Additionally, or alternatively, the client application 205 may leverage an SDK associated with the data store 230 such as to facilitate obtaining the user information.

The user information may be encrypted via a cryptographic key. For example, the blockchain address application 210 may perform an authentication flow with a user device (e.g., a computing device 140, such as the device via which the application is accessed, such as via a browser). The authentication flow may include exchange of a PRF and salt that the user device may use in combination with a user credential (e.g., a passkey) to generate a PRF output. That is, the blockchain address application 210 may request that the user device generates a PRF output using a PRF, salt, and a user credential. Using the PRF output, the blockchain address application 210 may generate a cryptographic key that is used to encrypt the user information. Because the cryptographic key is generated using a PRF output that is associated with a user credential, the user information encrypted by the cryptographic key may be revealed by a party having access to the user credential. That is, the encrypted user information 225-*a* may be decrypted by a user having access to a user credential used to create the cryptographic key that encrypted the information initially. In other words, only the user that has access to the credential that was used to encrypt the user information may decrypt the user information.

Figure 3:
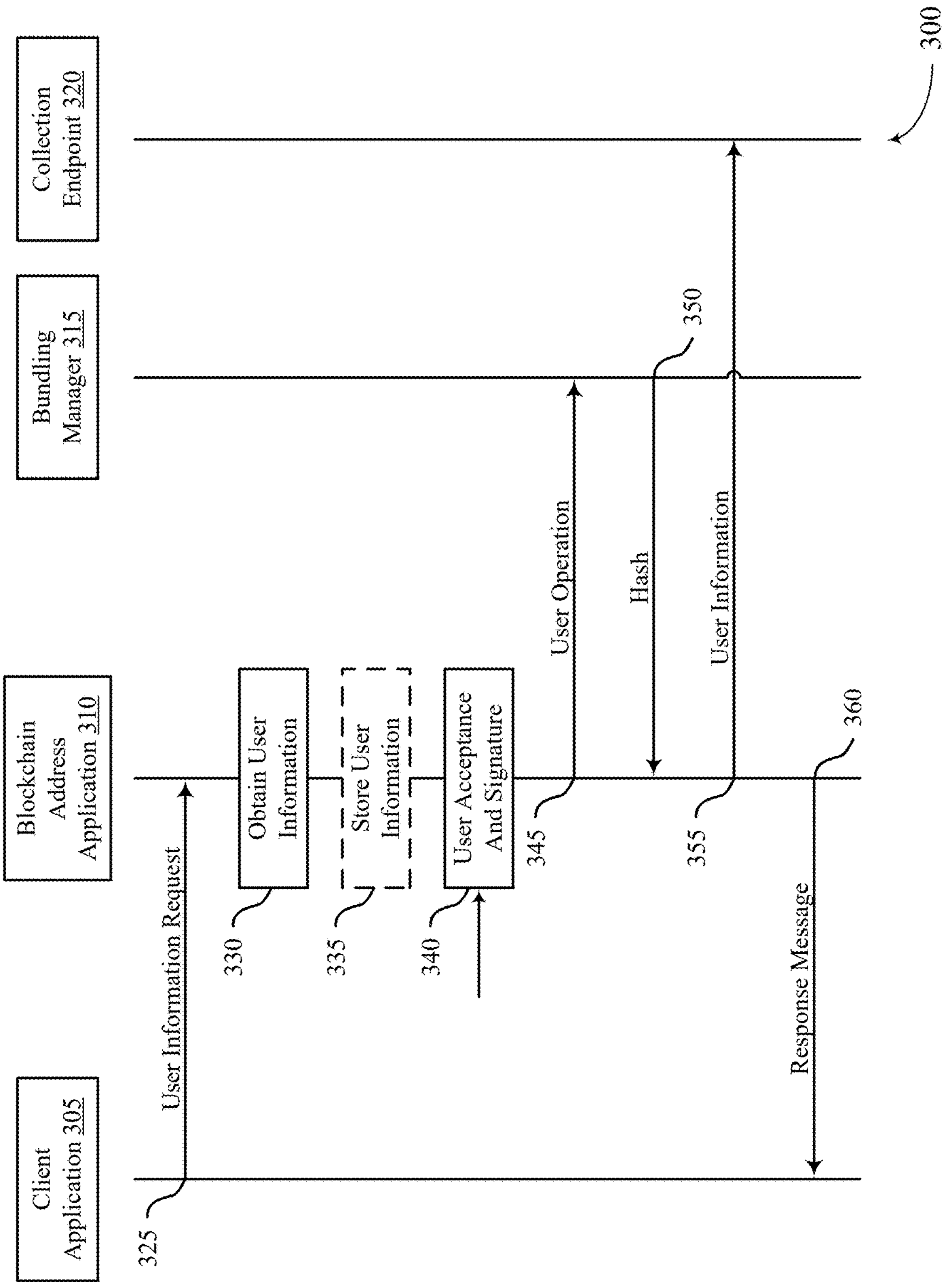
FIGS. 3 and 4 show examples of process flows that support blockchain address application user information management in accordance with aspects of the present disclosure.

FIG. 3 shows an example of a process flow 300 that supports blockchain address application user information management in accordance with aspects of the present disclosure. The process flow 300 may implement or be implemented by the computing environment 100, the computing environment 200, or both. For example, the process flow 300 may include a client application 305 and a blockchain address application 310, which may be examples of the corresponding devices or systems as described with reference to FIG. 2.

Alternative examples of the following may be implemented, where some operations are performed in a different order than described or are not performed at all. In some examples, operations may include additional features not mentioned below, or further operations may be added. Although the client application 305, the blockchain address application 310, a bundling manager 315, and a collection endpoint 320 are shown performing the operations of the process flow 300, some aspects of some operations may also be performed by one or more other components.

At 325, the client application 305 may transmit a user information request. For example, the blockchain address application 310 may receive, from a client application 305, a request message comprising a payload for signature by a blockchain address associated with the blockchain address application 310 and indicating requested user information to be provided to a collection endpoint 320 associated with the client application 305. In some examples, the blockchain address application 310 may receive the user information request via a SDK of the client application 305. For example, the client application 305 may (e.g., internally) transmit the request for user information from the client application 305 to the SDK, and the SDK may transmit the user information request to the blockchain address application 310. The user information request may be in the form of a transaction request transmitted between the client application 305 and the blockchain address application 310, and the transaction request may include one or more parameters that request the user information.

The user information request may include an indication of a collection endpoint 320 where the blockchain address application 310 is to provide the user information. As an example, the user information request may indicate a URL (e.g., a collection URL). Additionally, or alternatively, the user information request may include one or more fields. That is, the user information request may include or indicate fields corresponding to different information requested, such as an email address field, a shipping address field, a phone number field, or the like. The blockchain address application 310 may provide the user information to the collection endpoint 320 in accordance with the request (e.g., provide the information at the collection endpoint corresponding to each of the fields).

In some examples, the user information request may be an example of an Ethereum Improvement Proposal (EIP) message. For example, the user information request may be an example of a sendCalls application programming interface (API) call in accordance with EIP-5792. The user information request may be part of a transaction request. For example, the user information request may be attached to a transaction request. The transaction request may be an example of a transaction request defined by EIP-5792, where the user information request is a "capability" that is added to the transaction request. The request for user information may be specified as follows:

```
type DataRequest = {
  type: string
  required: boolean
}
type DataCallbackParams = {
  request: DataRequest[ ]
  url: string
}
```

In an example where the client application 305 is requesting a shipping address, a transaction request (e.g., wallet_sendCalls) including the user information request (e.g., including a capability dataCallback) may be as follows:

```
wallet_sendCalls({
  ...
  capabilities: {
    ...
    dataCallback: {
      request: [
        {
          type: 'address',
          required: true
        }
        {
          type: 'email',
          required: false
        }
      ],
      url: 'https:// . . . '
    }
  }
})
```

In the above example, the dataCallback capability may indicate that an address (e.g., a shipping address) is requested, but an email is not requested. Additionally, the dataCallback capability may indicate a url: 'https:// . . . ', which may be a URL of the collection endpoint 320.

At 330, the blockchain address application 310 may obtain user information. For example, the blockchain address application 310 may retrieve, using the blockchain address of the blockchain address application 310, the requested user information from a data store associated with the blockchain address application 310 and that stores user information for multiple users, where the response message includes the requested user information based on retrieving the requested user information from the data store. Additionally, or alternatively, the blockchain address application 310 may obtain, using the blockchain address associated with the blockchain address application and after receiving a request for the requested user information, an encrypted payload including the requested user information from a smart contract. The blockchain address application 310 may decrypt the requested user information using a cryptographic key associated with a user device that executes the blockchain address application 310. That is, the blockchain address application 310 may obtain the user information from a smart contract or a data store, such as the smart contract 215 or the data store 230 as described with reference to FIG. 2. In such examples, the blockchain address application 310 may prepopulate, at a user interface of the blockchain address application 310, fields corresponding to the requested user information after retrieving the requested user information.

Alternatively, the blockchain address application 310 may display the fields for entry of the information via the user interface (e.g., when the user information is not stored). For example, the blockchain address application 310 may display, via a user interface of the blockchain address application 310, one or more fields corresponding to the requested user information. The blockchain address application 310 may receive, via the one or more fields of the user interface, one or more user inputs including the requested user information, where the response message includes the requested user information based on the one or more user inputs. In other words, the blockchain address application 310 may obtain the user information via user input to the displayed fields.

At 335, the blockchain address application 310 may store user information. The user information may be stored on a wallet user object and/or pulled from a connected user account (e.g., of an application different than the blockchain address application 310, such as an application of the custodial token platform 110). For example, the blockchain address application 310 may store the requested user information in a data store associated with the blockchain address application 310. Additionally, or alternatively, the blockchain address application 310 may store the user information on a smart contract. For example, the blockchain address application 310 may encrypt the requested user information using a cryptographic key generated based on a passkey associated with a user of a user device and broadcast one or more second messages via the blockchain network configured to store, on a smart contract, the encrypted user information, the smart contract including a mapping of a blockchain addresses to respective sets of encrypted user information.

That is, the blockchain address application 310 may store the user information prior to obtaining the information from a storage location (e.g., before 330) or when user information was not received prior to obtaining the user information at 330 (e.g., not stored in the smart contract or data store, but obtained via user input). In such examples, the blockchain address application 310 may store the user information based on approval from the user. Storage of the user information at the smart contract may be described in greater detail elsewhere herein, including with reference to FIG. 4.

At 340, the blockchain address application 310 may receive an indication of user acceptance and a signature. For example, the blockchain address application 310 may display, via a user interface of the blockchain address application 310, the requested user information based on the requested user information being stored in a smart contract or a data store that is accessible to the blockchain address application 310. Additionally, or alternatively, the blockchain address application 310 may receive, via a user interface, one or more user inputs approving sharing of the requested user information with the client application 305, where the response message is transmitted in response to the one or more user inputs. That is, the user may sign a transaction indicated by a transaction request including the user information request. Additionally, the user may approve sharing of the user information with the client application 305 via the collection endpoint 320. For example, the blockchain address application 310 may display, via a user interface, the user information after retrieving stored user information or after receiving the user information via user input, and a user may confirm that the information is correct and approve sharing of the information with the client application 305.

At 345, the blockchain address application 310 may transmit the user operation to the bundling manager 315. That is, the bundling manager 315 may perform operations on a blockchain network (e.g., the blockchain network 105) in bundles or "batches." As an example, the bundling manager 315 may broadcast messages to the blockchain network configured to execute multiple operations in a queue on a periodic basis, when a quantity of operations in the queue reaches a threshold, or a combination thereof. For example, the blockchain address application 310 may broadcast, after receiving a user input executing the signature of the payload, one or more messages to a blockchain network and configured to execute an operation on the blockchain network. The operation may be a transfer of one or more crypto tokens from the blockchain address of the blockchain address application toa blockchain address of the client application 305 (e.g., a merchant). Broadcasting the one or more messages may include broadcasting the one or more messages configured to execute multiple operations on the blockchain network (e.g., a "bundle" of operations) including the operation. The bundling manager 315 may be a part of the blockchain address application 310. That is, the blockchain address application 310 may include a function or component that is understood to be the bundling manager 315.

At 350, the blockchain address application 310 may obtain a hash. For example, the blockchain address application 310 may obtain, in response to broadcasting the one or more messages to the blockchain network, a message hash (e.g., transaction hash) for the operation, the message hash being the identifier of the operation executed on the blockchain network. In some examples, the messages at 355, 360, or both may be transmitted in response to receiving the message hash for the operation at 350.

At 355, the blockchain address application 310 may provide the user information to the collection endpoint 320. For example, the blockchain address application 310 may transmit, to the client application 305 and using the collection endpoint 320, a response message including the requested user information and an identifier of the operation executed on the blockchain network. Providing the user information to the collection endpoint 320 may include transmitting, to the collection endpoint 320 (e.g., the collection URL), a Hypertext Transfer Protocol (HTTP) request that includes the hash (e.g., a transaction identifier) and the requested user information. In some examples, transmission of the user information to the collection endpoint 320 may refer to a webhook. That is, the blockchain address application 310 may include a webhook that, when triggered by completion of the user operation on the blockchain network (e.g., triggered by receipt of the hash at 350), causes the transmission of the user information to the collection endpoint 320. Thus, signing and broadcasting the payload may result in transfer of tokens to the client application 305 and providing the user information to the client application 305 (e.g., via the endpoint).

At 360, the blockchain address application 310 may transmit a response message to the client application 305. The response message may include a string identifier (SID) or be an example of a CallSID. The response message may indicate the hash of the operation (e.g., indicate a transaction identifier), indicate that the user information is provided to the collection endpoint 320, or both. Additionally, or alternatively, the response message may be absent the user information. That is, rather than sharing the user information directly with the client application 305, the blockchain address application 310 may securely share the user information via the collection endpoint 320.

In some examples, the blockchain address application 310 may provide the user information without prompts (e.g., without prompts in addition to prompts provided to generate the signature and/or approve the operation). The process flow 300 may support a one-click checkout experience for a user. For example, the user may provide a single user input to the blockchain address application 310 to approve the user information and sign the transaction. In some examples, the collection endpoint 320 may satisfy a policy of the client application 305, the blockchain address application 310, or both. For example, the collection endpoint 320 may be approved by the client application 305 and/or the blockchain address application 310 after an approval process that ensures user information is shared in a secure manner. Additionally, or alternatively, the blockchain address application 310 may share the user information with the client application 305 via the collection endpoint 320 based on the client application 305 being managed by the blockchain address application 310 or a service that manages the blockchain address application 310 (e.g., the custodial token platform 110). In such examples, the operation may include payments that are exchanged between the client application 305 (e.g., a receive address of the client application 305) and a blockchain address associated with the blockchain address application 310, where the payments are settled in an exchange account.

Figure 4:
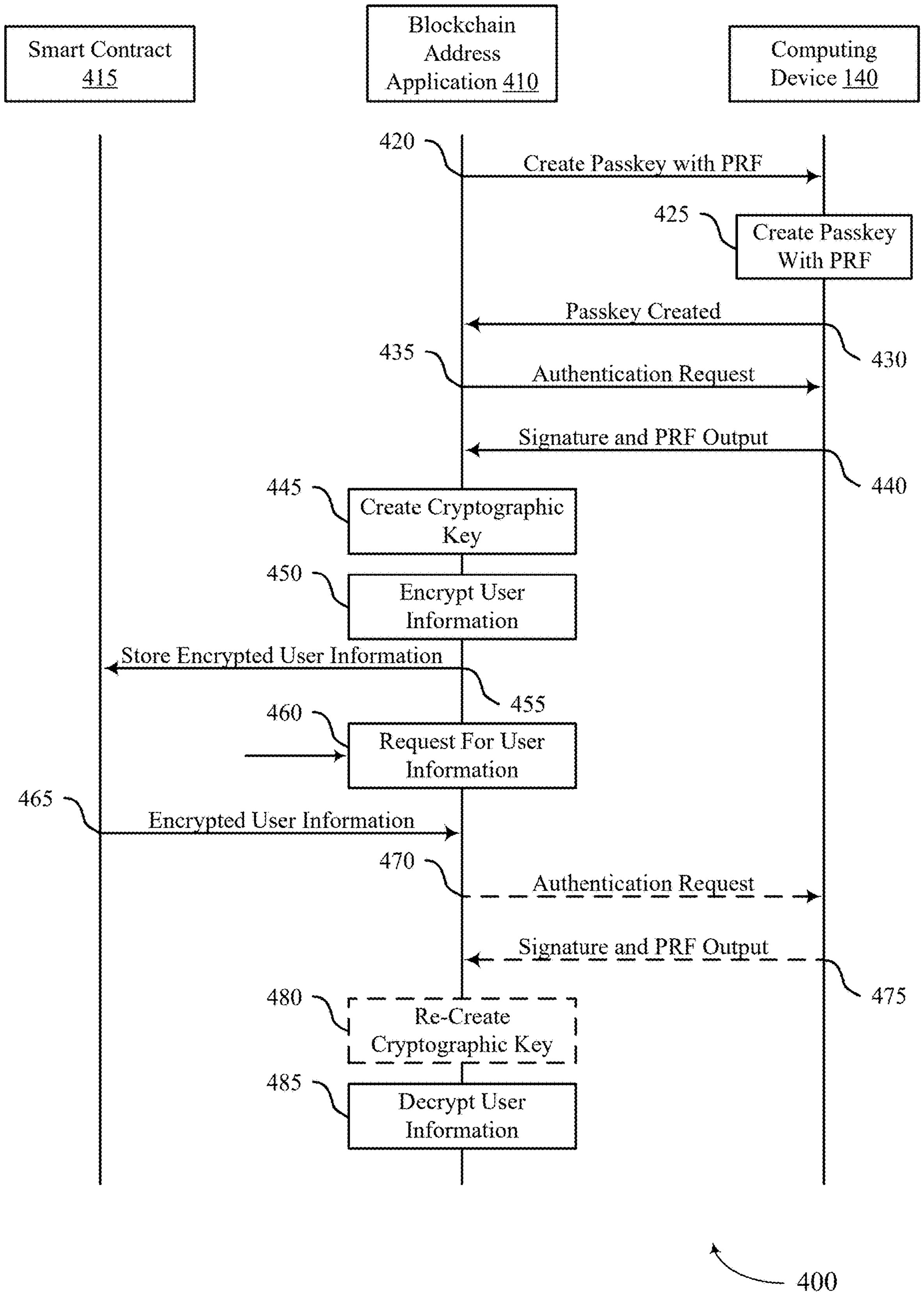

FIG. 4 shows an example of a process flow 400 that supports blockchain address application user information management in accordance with aspects of the present disclosure. The process flow 400 may implement or be implemented by the computing environment 100, the computing environment 200, or both. For example, the process flow 400 may include smart contract 415, a blockchain address application 410, and a computing device 140, which may be examples of the corresponding devices or systems as described with reference to FIGS. 1 through 3.

Alternative examples of the following may be implemented, where some operations are performed in a different order than described or are not performed at all. In some examples, operations may include additional features not mentioned below, or further operations may be added. Although the smart contract 415, the blockchain address application 410, and the computing device 140 are shown performing the operations of the process flow 400, some aspects of some operations may also be performed by one or more other components.

At 420, the blockchain address application 410 may request that the computing device 140 create a passkey with a PRF. For example, the blockchain address application 410 may request that a PRF be associated with a credential by specifying a PRF extension field with a salt during credential registration. As used herein, the passkey may be an example of a user credential. Other user credentials may be used in place of the passkey. An example of the request message is as follows:

```
const salt = new Uint8Array(new Array(32).fill(1)).buffer;
const regCredential = await navigator.credentials.create({
  publicKey: {
    ...,
    extensions: {
      prf: {
        eval: {
          first: salt,
        },
      },
```

-continued

```
    },
  },
});
```

At 425, the computing device 140 may create a passkey with the PRF. For example, the computing device 140 may use a PRF extension (e.g., a WebAuthn prf extension) to create a passkey or associate a passkey with the PRF. At 430, the blockchain address application 410 may receive an indication that the passkey is created. For example, the computing device 140 may indicate that the passkey is created and that the PRF is enabled.

At 435, the blockchain address application 410 may transmit an authentication request to the computing device 140. For example, the blockchain address application 410 may transmit an authentication request including the PRF extension and salt that were included in the message at 420. In response to the authentication request, at 440, the computing device 140 may transmit a signature and a PRF output to the blockchain address application 410. The PRF output may be associated with the passkey based on the PRF being associated with the passkey. That is, the PRF output may be understood as being output from the passkey (e.g., from a user credential).

At 445, the blockchain address application 410 may create a cryptographic key. For example, the blockchain address application 410 may generate the cryptographic key from an output of a PRF associated with the passkey associated with the user. In some examples, the PRF may be enabled during authentication of a signature prior to receiving one or more user inputs (e.g., indicating user information). That is, the blockchain address application 410 may derive a local cryptographic key (e.g., CryptoKey) using the PRF output from the passkey of the user. The key may be stored at the computing device 140 (e.g., client-side). Additionally, or alternatively, the cryptographic key may be used to encrypt and decrypt user information. An example of generation of the cryptographic key using the PRF output is as follows:

```
const salt = new Uint8Array(new Array(32).fill(1)).buffer;
const credential = await navigator.credentials.get({
  publicKey: {
    ...,
    extensions: {
      prf: {
        eval: {
          first: salt,
        },
      },
    },
  },
});
const rawKey = credential.getClientExtensionResults( ).prf.results.first;
const encryptionKey = await crypto.subtle.importKey(
  “raw”,
  rawKey,
  “HKDF”,
  false,
  [“encrypt”, “decrypt”],
);
const nonce = crypto.getRandomValues(new Uint8Array(12));
const encryptedProfile = await crypto.subtle.encrypt(
  { name: “AES-GCM”, iv: nonce },
  encryptionKey,
  new TextEncoder( ).encode(JSON.stringify({email: “name@gmail.com”})),
);
```

-continued

```
const decryptedProfile = await crypto.subtle.decrypt(
  { name: "AES-GCM", iv: nonce },
  encryptionKey,
  encryptedProfile,
);
```

At 450, the blockchain address application 410 may encrypt user information. For example, the blockchain address application 410 may receive one or more user inputs indicative of user information and encrypt the user information using a cryptographic key generated based on a passkey associated with a user of the computing device 140 (e.g., a user device). That is, the blockchain address application 410 may encrypt the user information, such as an email address, a shipping address, a phone number, or the like, using the cryptographic key that is generated using the PRF output. In some examples, the blockchain address application 410 may obtain the user information (e.g., prior to encryption at 450) via user inputs. For example, the blockchain address application 410 may encrypt the user information stored in a JavaScript Object Notation (JSON) object. In some examples, the blockchain address application 410 may encrypt the user information as a JSON object. That is, the blockchain address application 410 may use the cryptographic key derived from the passkey of the user (e.g., a user credential) to encrypt a JSON object of some user-entered information.

At 455, the blockchain address application 410 may store encrypted information at the smart contract 415. The smart contract 415 may include at least one function that accepts user information (e.g., in the form of raw bytes) and stores the user information in a mapping keyed on the address of the sender (e.g., the blockchain address of the user that is associated with the blockchain address application 410). The smart contract 415 may store a mapping of blockchain addresses to encrypted sets of user information, such as the mapping shown with reference to FIG. 2. For example, the blockchain address application 410 may broadcast one or more messages via a blockchain network, where the one or more messages are configured to store, on a smart contract 415, a mapping of a blockchain address to the encrypted user information, where the blockchain address is associated with the passkey. In some examples, storing the encrypted information may refer to setting a "profile" at the smart contract 415. That is, the user, via the blockchain address application 410 (e.g., using a blockchain address associated with the blockchain address application 410) may submit a transaction with a call to set a profile (e.g., setProfile) with the encrypted JSON object as a profile argument. An example of setting the profile at the smart contract 415 is as follows:

```
// SPDX-License-Identifier: UNLICENSED
pragma solidity ^0.8.13;
contract Profiles {
  mapping(address => bytes) public profiles;
  function setProfile(bytes calldata profile) external payable {
    profiles[msg.sender] = profile;
  }
}
```

At 460, the blockchain address application 410 may receive a request for user information. For example, the blockchain address application 410 may receive a request for user information from a client application, such as from the client application 305 as described with reference to FIG. 3. In response to receiving the request for user information, at 465, the blockchain address application 410 may obtain the encrypted user information from the smart contract 415. For example, the blockchain address application 410 may obtain, using the blockchain address and after receiving a request for the user information at 460, the encrypted user information from the smart contract 415. The blockchain address application 410 may retrieve the information by reading the publicly accessible mapping on the smart contract 415 (e.g., the profiles mapping). That is, the blockchain address application 410 may look up, on the smart contract 415 the encrypted user information corresponding to the blockchain address that the user information was requested for. The blockchain address application 410 may retrieve the encrypted user information mapped to the indicated blockchain address.

In some examples, the blockchain address application 410 may not store the cryptographic key. Accordingly, to decrypt the user information retrieved from the smart contract 415, the blockchain address application 410 may re-create the cryptographic key using a same PRF and salt as at 420 and 435. For example, at 470, the blockchain address application 410 may transmit an authentication request to the computing device 140. The authentication request may include a same PRF extension and a same salt as the authentication request at 435. That is, the blockchain address application 410 may transmit an authentication challenge to the computing device 140 (e.g., a user device), the authentication challenge including a PRF and a salt used during generation of the cryptographic key at 445.

At 475, the blockchain address application 410 may obtain a signature and PRF output from the computing device 140. The PRF output may be the same as a PRF output provided at 440. That is, the blockchain address application 410 may receive, in response to the authentication challenge, a signature and an output of the PRF, where the cryptographic key is regenerated using the output of the PRF. At 480, the blockchain address application 410 may re-create the cryptographic key. By including the same PRF extension and the same salt, a signature and a PRF output provided by the computing device 140 may be the same as at 440 such that a same cryptographic key is able to be generated and used to decrypt the user information. For example, the blockchain address application 410 may regenerate the cryptographic key based on the passkey associated with the user, where the user information is decrypted after regenerating the cryptographic key.

At 485, the blockchain address application 410 may decrypt the user information. For example, the blockchain address application 410 may decrypt the user information using the cryptographic key. In examples where the cryptographic key is stored on a browser that the blockchain address application 410 runs on, the blockchain address application 410 may decrypt the user information using the cryptographic key stored in the browser. Alternatively, the blockchain address application 410 may decrypt the user information using the cryptographic key re-created at 480.

Figure 5:
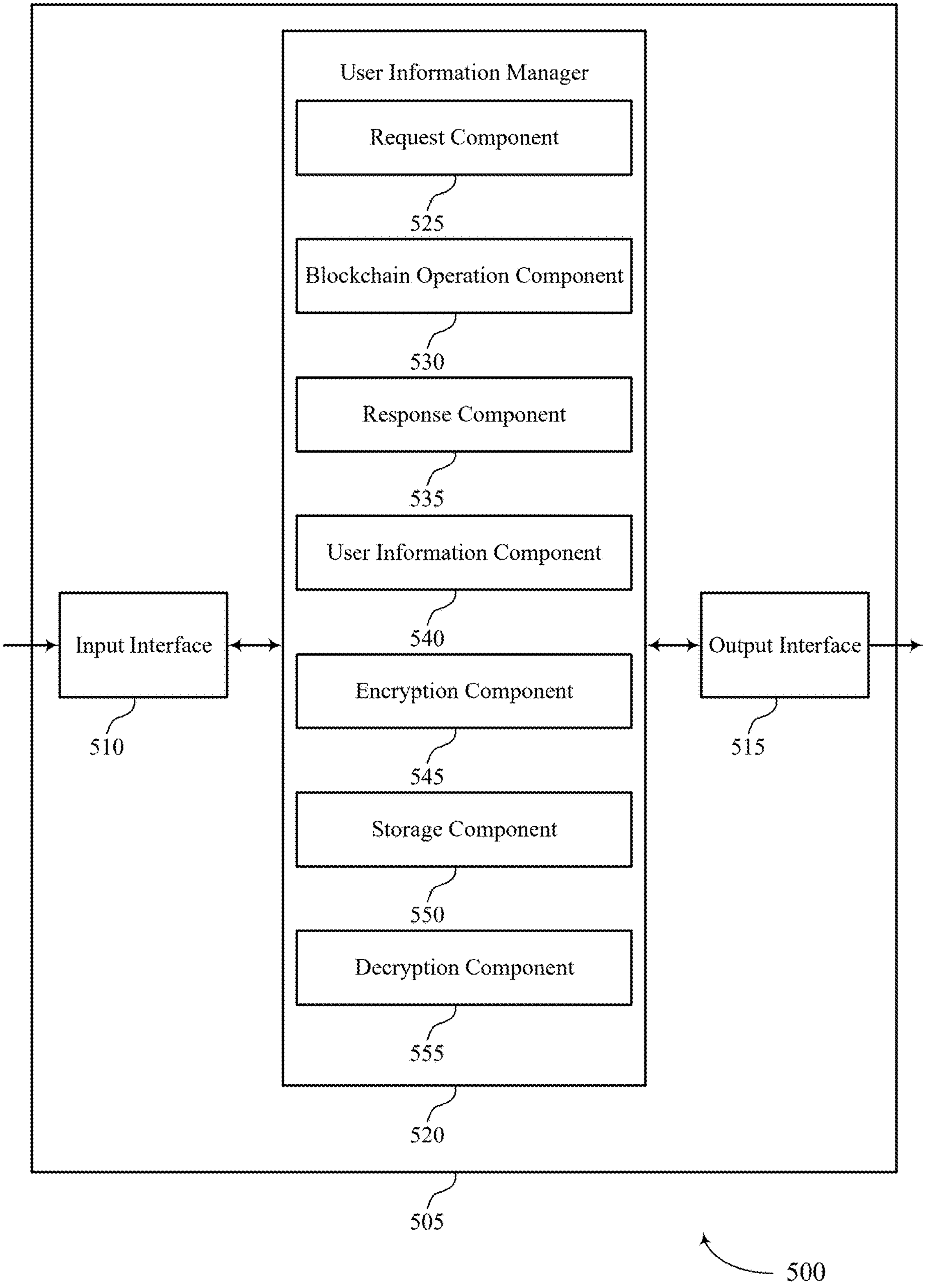
FIG. 5 shows a block diagram of an apparatus that supports blockchain address application user information management in accordance with aspects of the present disclosure.

FIG. 5 shows a block diagram 500 of a system 505 that supports blockchain address application user information management in accordance with aspects of the present disclosure. The system 505 may include an input interface 510, an output interface 515, and a user information manager 520. The system 505, or one or more components of the system 505 (e.g., the input interface 510, the output interface 515, the user information manager 520), may include at least one processor, which may be coupled with at least one memory, to support the described techniques. Each of these components may communicate, directly or indirectly, with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, transactions, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the user information manager 520 to support blockchain address application user information management. In some cases, the input interface 510 may be a component of a network interface 725 as described with reference to FIG. 7.

The output interface 515 may manage output signaling for the system 505. For example, the output interface 515 may receive signaling from other components of the system 505, such as the user information manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the user information manager 520 may include a request component 525, a blockchain operation component 530, a response component 535, a user information component 540, an encryption component 545, a storage component 550, a decryption component 555, or any combination thereof. In some examples, the user information manager 520, or various components thereof, may be configured to perform various operations (e.g., receiving, monitoring, transmitting) using or otherwise in cooperation with the input interface 510, the output interface 515, or both. For example, the user information manager 520 may receive information from the input interface 510, send information to the output interface 515, or be integrated in combination with the input interface 510, the output interface 515, or both to receive information, transmit information, or perform various other operations as described herein.

The request component 525 may be configured as or otherwise support a means for receiving, at a blockchain address application and from a client application, a request message comprising a payload for signature by a blockchain address associated with the blockchain address application and indicating requested user information to be provided to a collection endpoint associated with the client application. The blockchain operation component 530 may be configured as or otherwise support a means for broadcasting, after receiving a user input executing the signature of the payload, one or more messages to a blockchain network and configured to execute an operation on the blockchain network. The response component 535 may be configured as or otherwise support a means for transmitting, to the client application and using the collection endpoint, a response message comprising the requested user information and an identifier of the operation executed on the blockchain network.

The user information component 540 may be configured as or otherwise support a means for receiving one or more user inputs indicative of user information. The encryption component 545 may be configured as or otherwise support a means for encrypting the user information using a cryptographic key generated based on a passkey associated with a user of a user device. The storage component 550 may be configured as or otherwise support a means for broadcasting one or more messages via a blockchain network, wherein the one or more messages are configured to store, on a smart contract, a mapping of a blockchain address to the encrypted user information, wherein the blockchain address is associated with the passkey. The blockchain operation component 530 may be configured as or otherwise support a means for obtaining, using the blockchain address and after receiving a request for the user information, the encrypted user information from the smart contract. The decryption component 555 may be configured as or otherwise support a means for decrypting the user information using the cryptographic key.

Figure 6:
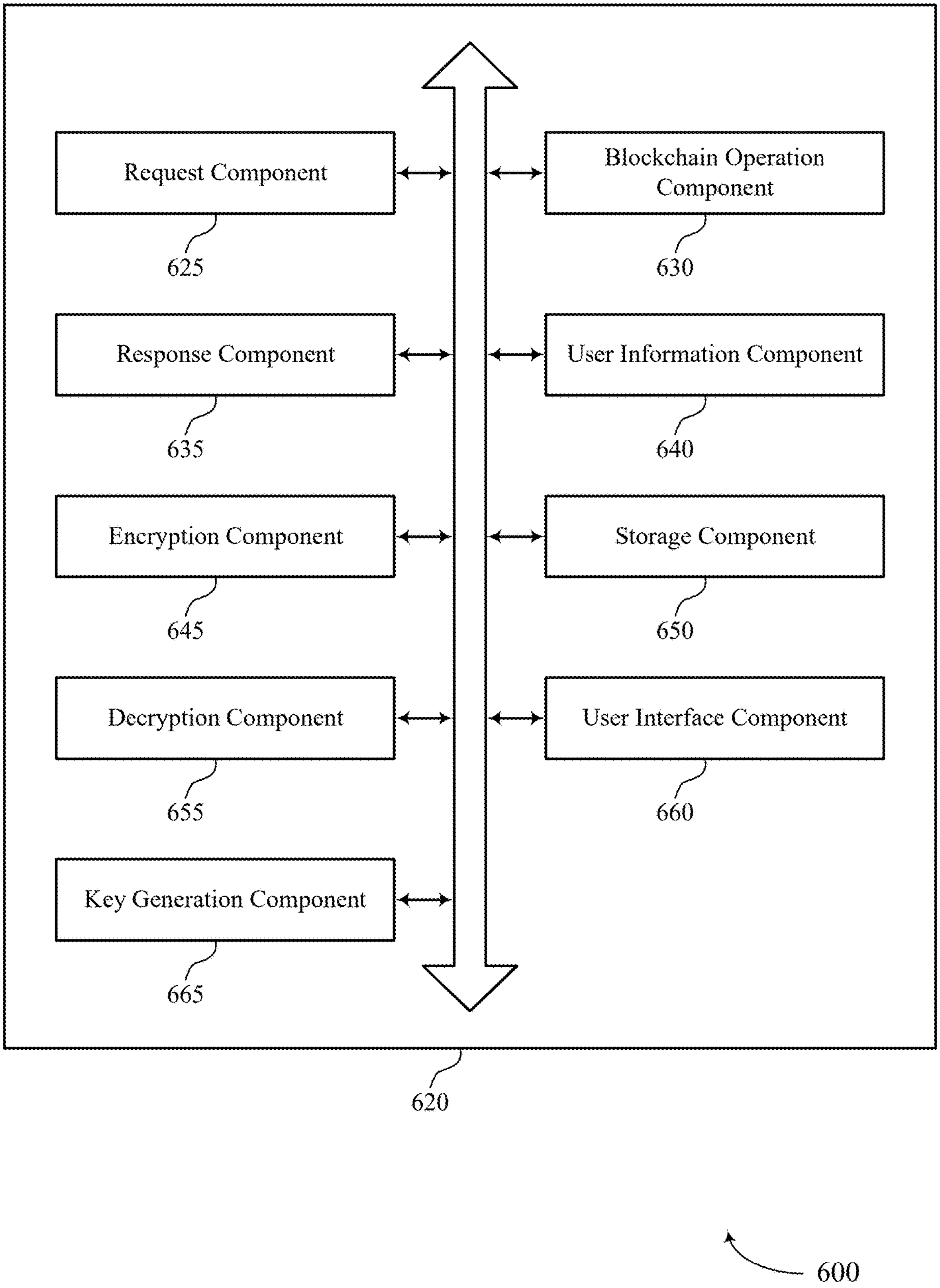
FIG. 6 shows a block diagram of a user information manager that supports blockchain address application user information management in accordance with aspects of the present disclosure.

FIG. 6 shows a block diagram 600 of a user information manager 620 that supports blockchain address application user information management in accordance with aspects of the present disclosure. The user information manager 620 may be an example of aspects of a user information manager or a user information manager 520, or both, as described herein. The user information manager 620, or various components thereof, may be an example of means for performing various aspects of blockchain address application user information management as described herein. For example, the user information manager 620 may include a request component 625, a blockchain operation component 630, a response component 635, a user information component 640, an encryption component 645, a storage component 650, a decryption component 655, a user interface component 660, a key generation component 665, or any combination thereof. Each of these components may communicate, directly or indirectly, with one another (e.g., via one or more buses, communications links, communications interfaces, or any combination thereof).

The request component 625 may be configured as or otherwise support a means for receiving, at a blockchain address application and from a client application, a request message comprising a payload for signature by a blockchain address associated with the blockchain address application and indicating requested user information to be provided to a collection endpoint associated with the client application. The blockchain operation component 630 may be configured as or otherwise support a means for broadcasting, after receiving a user input executing the signature of the payload, one or more messages to a blockchain network and configured to execute an operation on the blockchain network. The response component 635 may be configured as or otherwise support a means for transmitting, to the client application and using the collection endpoint, a response message comprising the requested user information and an identifier of the operation executed on the blockchain network.

In some examples, the user interface component 660 may be configured as or otherwise support a means for displaying, via a user interface of the blockchain address application, one or more fields corresponding to the requested user information. In some examples, the user information component 640 may be configured as or otherwise support a means for receiving, via the one or more fields of the user interface, one or more user inputs comprising the requested user information, wherein the response message comprises the requested user information based at least in part on the one or more user inputs.

In some examples, the storage component 650 may be configured as or otherwise support a means for storing the requested user information in a data store associated with the blockchain address application.

In some examples, the user information component 640 may be configured as or otherwise support a means for retrieving, using the blockchain address of the blockchain address application, the requested user information from a data store associated with the blockchain address application and that stores user information for a plurality of users, wherein the response message comprises the requested user information based at least in part on retrieving the requested user information from the data store.

In some examples, the user interface component 660 may be configured as or otherwise support a means for displaying, via a user interface of the blockchain address application, the requested user information based at least in part on the requested user information being stored in a smart contract or a data store that is accessible to the blockchain address application.

In some examples, the user interface component 660 may be configured as or otherwise support a means for receiving, via a user interface, one or more user inputs approving sharing of the requested user information with the client application, wherein the response message is transmitted in response to the one or more user inputs.

In some examples, the blockchain operation component 630 may be configured as or otherwise support a means for obtaining, in response to broadcasting the one or more messages to the blockchain network, a message hash for the operation, the message hash being the identifier of the operation executed on the blockchain network.

In some examples, the response message is transmitted in response to receiving the message hash for the operation.

In some examples, the encryption component 645 may be configured as or otherwise support a means for encrypting the requested user information using a cryptographic key generated based on a passkey associated with a user of a user device. In some examples, the storage component 650 may be configured as or otherwise support a means for broadcasting one or more second messages via the blockchain network configured to store, on a smart contract, the smart contract comprising a mapping of a blockchain addresses to respective sets of encrypted user information.

In some examples, the user information component 640 may be configured as or otherwise support a means for obtaining, using the blockchain address associated with the blockchain address application and after receiving a request for the requested user information, an encrypted payload comprising the requested user information from a smart contract; and. In some examples, the decryption component 655 may be configured as or otherwise support a means for decrypting the requested user information using a cryptographic key associated with a user device that executes the blockchain address application.

In some examples, to support broadcasting the one or more messages to the blockchain network, the blockchain operation component 630 may be configured as or otherwise support a means for broadcasting the one or more messages to the blockchain network and configured to execute a plurality of operations on the blockchain network including the operation.

In some examples, the requested user information comprises an email address, a phone number, a shipping address, or any combination thereof.

In some examples, the collection endpoint is a uniform resource locator (URL).

The user information component 640 may be configured as or otherwise support a means for receiving one or more user inputs indicative of user information. The encryption component 645 may be configured as or otherwise support a means for encrypting the user information using a cryptographic key generated based on a passkey associated with a user of a user device. The storage component 650 may be configured as or otherwise support a means for broadcasting one or more messages via a blockchain network, wherein the one or more messages are configured to store, on a smart contract, a mapping of a blockchain address to the encrypted user information, wherein the blockchain address is associated with the passkey. In some examples, the blockchain operation component 630 may be configured as or otherwise support a means for obtaining, using the blockchain address and after receiving a request for the user information, the encrypted user information from the smart contract. The decryption component 655 may be configured as or otherwise support a means for decrypting the user information using the cryptographic key.

In some examples, the key generation component 665 may be configured as or otherwise support a means for generating the cryptographic key from an output of a PRF associated with the passkey associated with the user.

In some examples, the PRF is enabled during authentication of a signature prior to receiving the one or more user inputs.

In some examples, the key generation component 665 may be configured as or otherwise support a means for regenerating the cryptographic key based at least in part on the passkey associated with the user, wherein the user information is decrypted after regenerating the cryptographic key.

In some examples, the key generation component 665 may be configured as or otherwise support a means for transmitting an authentication challenge to the user device, the authentication challenge including a PRF and a salt used during generation of the cryptographic key. In some examples, the key generation component 665 may be configured as or otherwise support a means for receiving, in response to the authentication challenge, a signature and an output of the PRF, wherein the cryptographic key is regenerated using the output of the PRF.

In some examples, to support encrypting the user information, the encryption component 645 may be configured as or otherwise support a means for encrypting the user information stored in a JSON object.

In some examples, the user information comprises an email address, a phone number, a shipping address, or any combination thereof.

In some examples, the request component 625 may be configured as or otherwise support a means for receiving, at a blockchain address application and from a client application, a request message comprising a payload for signature by the blockchain address associated with the blockchain address application and indicating that the user information is to be provided to a collection endpoint associated with the client application, wherein the encrypted user information is obtained and decrypted after receiving the request message. In some examples, the blockchain operation component 630 may be configured as or otherwise support a means for broadcasting, after receiving a user input executing the signature of the payload, one or more second messages to the blockchain network and configured to execute an operation on the blockchain network. In some examples, the response component 635 may be configured as or otherwise support a means for transmitting, to the client application and using the collection endpoint, a response message comprising the user information and an identifier of the operation executed on the blockchain network.

In some examples, the collection endpoint is a URL.

Figure 7:
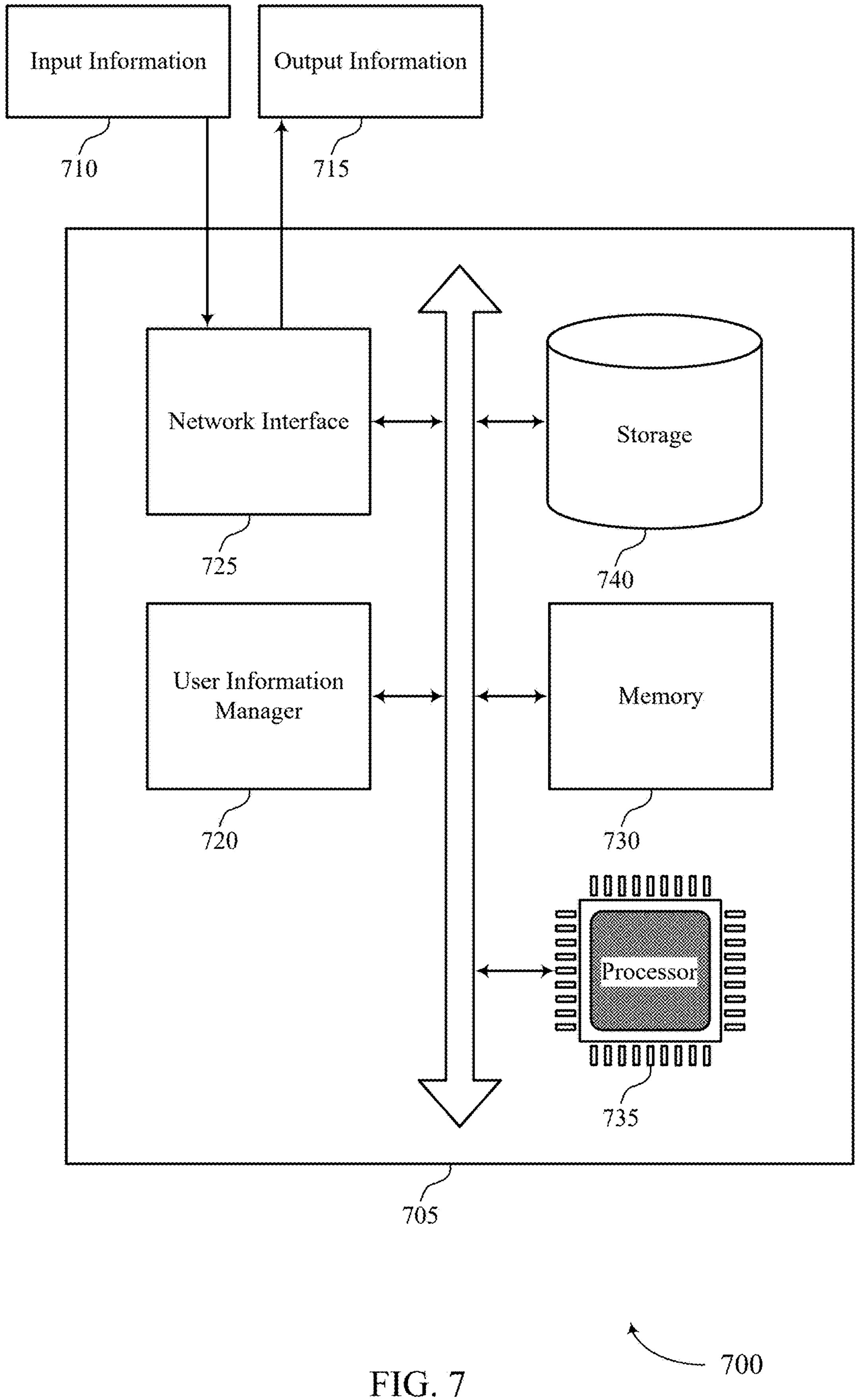
FIG. 7 shows a diagram of a system including a device that supports blockchain address application user information management in accordance with aspects of the present disclosure.

FIG. 7 shows a diagram of a system 700 including a system 705 that supports blockchain address application user information management in accordance with aspects of the present disclosure. The system 705 may be an example of or include components of a system 505 as described herein. The system 705 may include components for bi-directional voice and data communications including components for transmitting and receiving communications, such as a user information manager 720, an input information 710, an output information 715, a network interface 725, at least one memory 730, at least one processor 735, and a storage 740. Each of these components may communicate, directly or indirectly, with one another (e.g., via one or more buses, communications links, communications interfaces, or any combination thereof).

The network interface 725 may enable the system 705 to exchange information (e.g., input information 710, output information 715, or both) with other systems or devices (not shown). For example, the network interface 725 may enable the system 705 to connect to a network (e.g., a network 135 as described herein). The network interface 725 may include one or more wireless network interfaces, one or more wired network interfaces, or any combination thereof.

Memory 730 may include RAM, ROM, or both. The memory 730 may store computer-readable, computer-executable software including instructions that, when executed, cause at least one processor 735 to perform various functions described herein, such as functions supporting blockchain address application user information management. In some cases, the memory 730 may contain, among other things, a basic input/output system (BIOS), which may control basic hardware or software operation such as the interaction with peripheral components or devices. In some cases, the memory 730 may be an example of aspects of one or more components of a custodial token platform 110 as described with reference to FIG. 1. The memory 730 may be an example of a single memory or multiple memories. For example, the system 705 may include one or more memories 730.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in at least one memory 730 to perform various functions (e.g., functions or tasks supporting blockchain address application user information management). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. The processor 735 may be an example of a single processor or multiple processors. For example, the system 705 may include one or more processors 735.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1.

For example, the user information manager 720 may be configured as or otherwise support a means for receiving, at a blockchain address application and from a client application, a request message comprising a payload for signature by a blockchain address associated with the blockchain address application and indicating requested user information to be provided to a collection endpoint associated with the client application. The user information manager 720 may be configured as or otherwise support a means for broadcasting, after receiving a user input executing the signature of the payload, one or more messages to a blockchain network and configured to execute an operation on the blockchain network. The user information manager 720 may be configured as or otherwise support a means for transmitting, to the client application and using the collection endpoint, a response message comprising the requested user information and an identifier of the operation executed on the blockchain network.

For example, the user information manager 720 may be configured as or otherwise support a means for receiving one or more user inputs indicative of user information. The user information manager 720 may be configured as or otherwise support a means for encrypting the user information using a cryptographic key generated based on a passkey associated with a user of a user device. The user information manager 720 may be configured as or otherwise support a means for broadcasting one or more messages via a blockchain network, wherein the one or more messages are configured to store, on a smart contract, a mapping of a blockchain address to the encrypted user information, wherein the blockchain address is associated with the passkey. The user information manager 720 may be configured as or otherwise support a means for obtaining, using the blockchain address and after receiving a request for the user information, the encrypted user information from the smart contract. The user information manager 720 may be configured as or otherwise support a means for decrypting the user information using the cryptographic key.

By including or configuring the user information manager 720 in accordance with examples as described herein, the system 705 may support techniques for improved storage and communication of user information.

Figure 8:
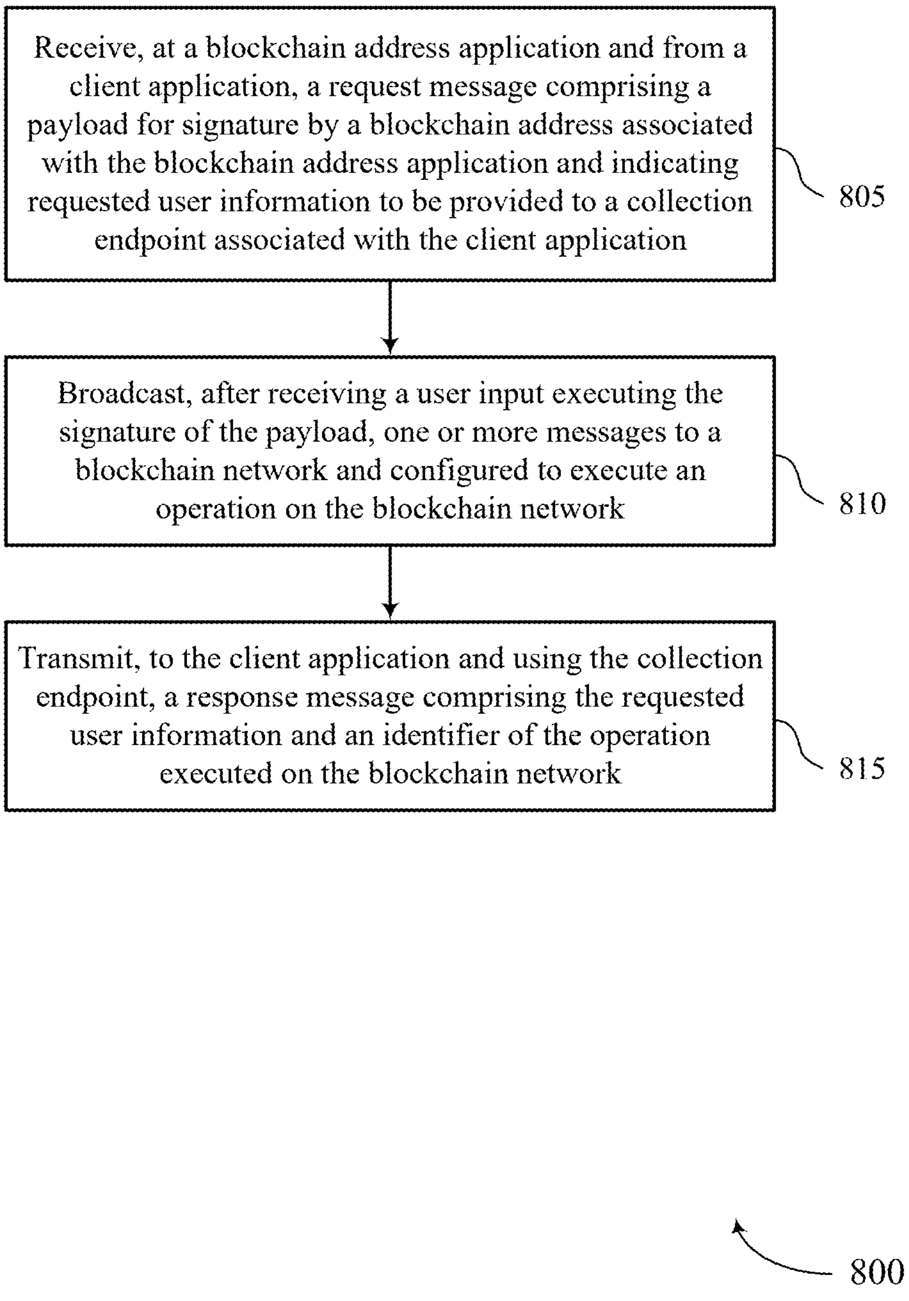
FIGS. 8 through 11 show flowcharts illustrating methods that support blockchain address application user information management in accordance with aspects of the present disclosure.

FIG. 8 shows a flowchart illustrating a method 800 that supports blockchain address application user information management in accordance with aspects of the present disclosure. The operations of the method 800 may be implemented by a blockchain address application or its components as described herein. For example, the operations of the method 800 may be performed by a blockchain address application as described with reference to FIGS. 1 through 7. In some examples, a blockchain address application may execute a set of instructions to control the functional elements of the blockchain address application to perform the described functions. Additionally, or alternatively, the blockchain address application may perform aspects of the described functions using special-purpose hardware.

At 805, the method may include receiving, at a blockchain address application and from a client application, a request message comprising a payload for signature by a blockchain address associated with the blockchain address application and indicating requested user information to be provided to a collection endpoint associated with the client application. The operations of 805 may be performed in accordance with examples as disclosed herein. In some examples, aspects of the operations of 805 may be performed by a request component 625 as described with reference to FIG. 6.

At 810, the method may include broadcasting, after receiving a user input executing the signature of the payload, one or more messages to a blockchain network and configured to execute an operation on the blockchain network. The operations of 810 may be performed in accordance with examples as disclosed herein. In some examples, aspects of the operations of 810 may be performed by a blockchain operation component 630 as described with reference to FIG. 6.

At 815, the method may include transmitting, to the client application and using the collection endpoint, a response message comprising the requested user information and an identifier of the operation executed on the blockchain network. The operations of 815 may be performed in accordance with examples as disclosed herein. In some examples, aspects of the operations of 815 may be performed by a response component 635 as described with reference to FIG. 6.

Figure 9:
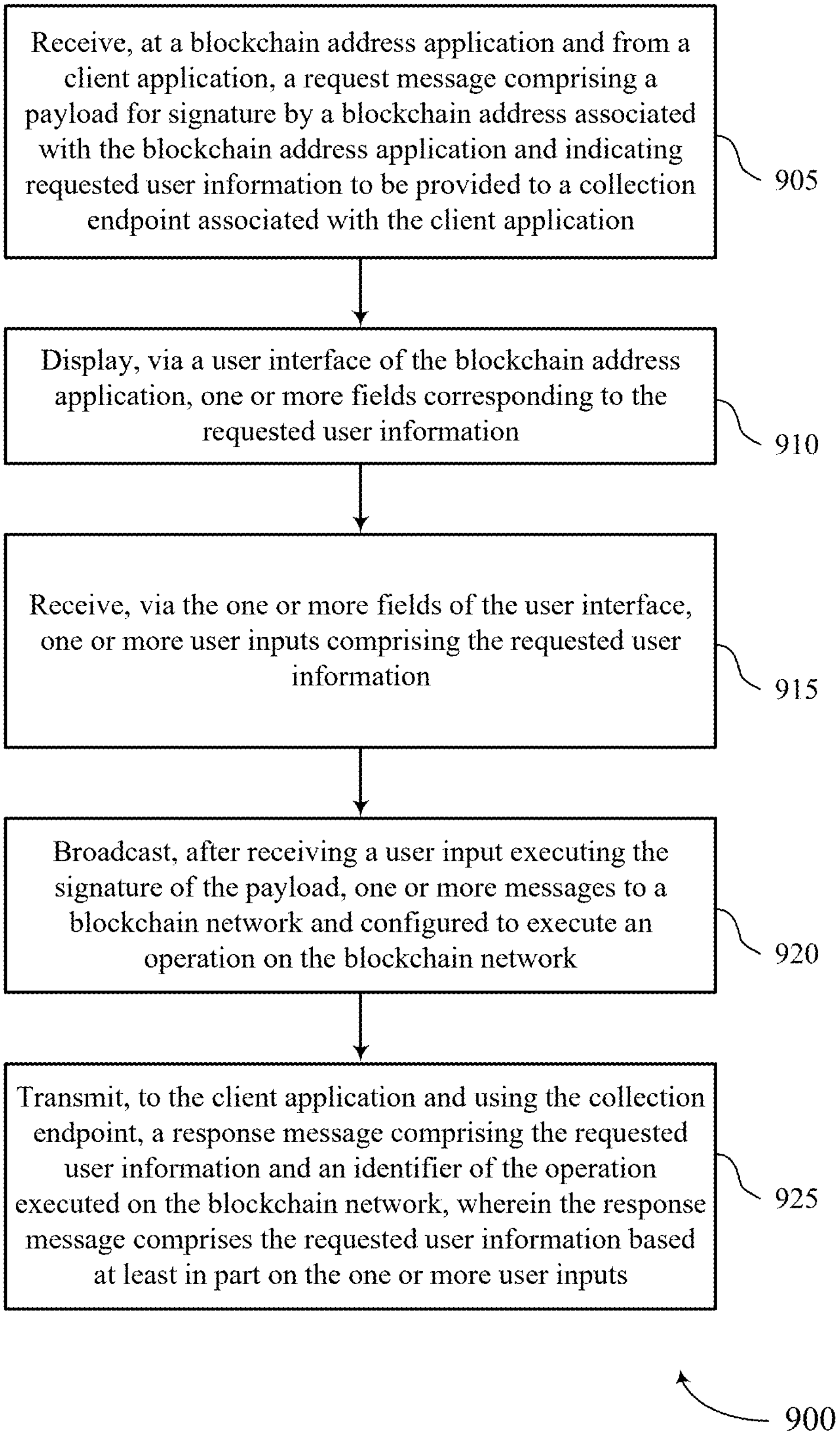

FIG. 9 shows a flowchart illustrating a method 900 that supports blockchain address application user information management in accordance with aspects of the present disclosure. The operations of the method 900 may be implemented by a blockchain address application or its components as described herein. For example, the operations of the method 900 may be performed by a blockchain address application as described with reference to FIGS. 1 through 7. In some examples, a blockchain address application may execute a set of instructions to control the functional elements of the blockchain address application to perform the described functions. Additionally, or alternatively, the blockchain address application may perform aspects of the described functions using special-purpose hardware.

At 905, the method may include receiving, at a blockchain address application and from a client application, a request message comprising a payload for signature by a blockchain address associated with the blockchain address application and indicating requested user information to be provided to a collection endpoint associated with the client application. The operations of 905 may be performed in accordance with examples as disclosed herein. In some examples, aspects of the operations of 905 may be performed by a request component 625 as described with reference to FIG. 6.

At 910, the method may include displaying, via a user interface of the blockchain address application, one or more fields corresponding to the requested user information. The operations of 910 may be performed in accordance with examples as disclosed herein. In some examples, aspects of the operations of 910 may be performed by a user interface component 660 as described with reference to FIG. 6.

At 915, the method may include receiving, via the one or more fields of the user interface, one or more user inputs comprising the requested user information. The operations of 915 may be performed in accordance with examples as disclosed herein. In some examples, aspects of the operations of 915 may be performed by a user information component 640 as described with reference to FIG. 6.

At 920, the method may include broadcasting, after receiving a user input executing the signature of the payload, one or more messages to a blockchain network and configured to execute an operation on the blockchain network. The operations of 920 may be performed in accordance with examples as disclosed herein. In some examples, aspects of the operations of 920 may be performed by a blockchain operation component 630 as described with reference to FIG. 6.

At 925, the method may include transmitting, to the client application and using the collection endpoint, a response message comprising the requested user information and an identifier of the operation executed on the blockchain network, wherein the response message comprises the requested user information based at least in part on the one or more user inputs. The operations of 925 may be performed in accordance with examples as disclosed herein. In some examples, aspects of the operations of 925 may be performed by a response component 635 as described with reference to FIG. 6.

Figure 10:
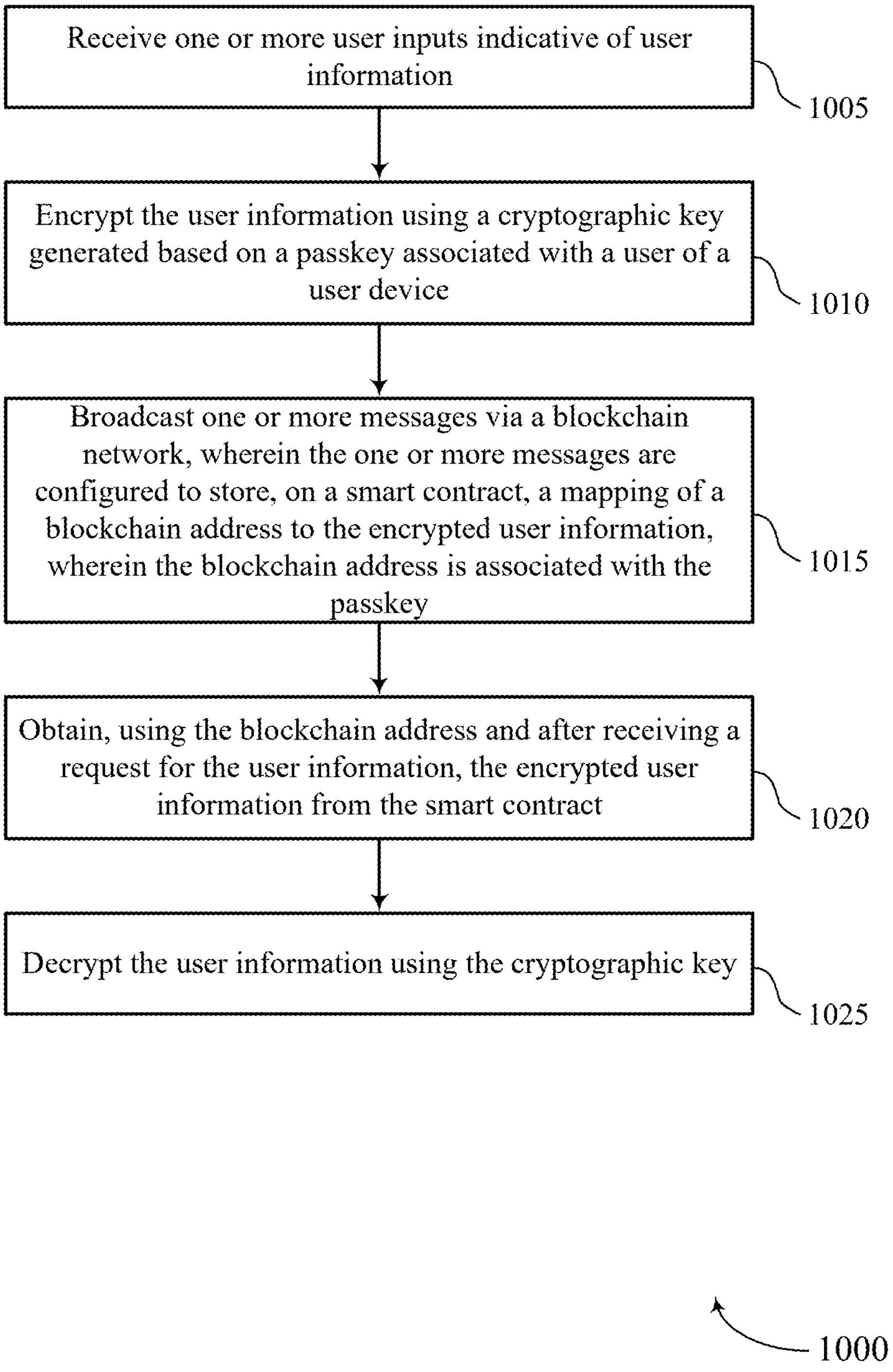

FIG. 10 shows a flowchart illustrating a method 1000 that supports blockchain address application user information management in accordance with aspects of the present disclosure. The operations of the method 1000 may be implemented by a blockchain address application or its components as described herein. For example, the operations of the method 1000 may be performed by a blockchain address application as described with reference to FIGS. 1 through 7. In some examples, a blockchain address application may execute a set of instructions to control the functional elements of the blockchain address application to perform the described functions. Additionally, or alternatively, the blockchain address application may perform aspects of the described functions using special-purpose hardware.

At 1005, the method may include receiving one or more user inputs indicative of user information. The operations of 1005 may be performed in accordance with examples as disclosed herein. In some examples, aspects of the operations of 1005 may be performed by a user information component 640 as described with reference to FIG. 6.

At 1010, the method may include encrypting the user information using a cryptographic key generated based on a passkey associated with a user of a user device. The operations of 1010 may be performed in accordance with examples as disclosed herein. In some examples, aspects of the operations of 1010 may be performed by an encryption component 645 as described with reference to FIG. 6.

At 1015, the method may include broadcasting one or more messages via a blockchain network, wherein the one or more messages are configured to store, on a smart contract, a mapping of a blockchain address to the encrypted user information, wherein the blockchain address is associated with the passkey. The operations of 1015 may be performed in accordance with examples as disclosed herein. In some examples, aspects of the operations of 1015 may be performed by a storage component 650 as described with reference to FIG. 6.

At 1020, the method may include obtaining, using the blockchain address and after receiving a request for the user information, the encrypted user information from the smart contract. The operations of 1020 may be performed in accordance with examples as disclosed herein. In some examples, aspects of the operations of 1020 may be performed by a blockchain operation component 630 as described with reference to FIG. 6.

At 1025, the method may include decrypting the user information using the cryptographic key. The operations of 1025 may be performed in accordance with examples as disclosed herein. In some examples, aspects of the operations of 1025 may be performed by a decryption component 655 as described with reference to FIG. 6.

Figure 11:
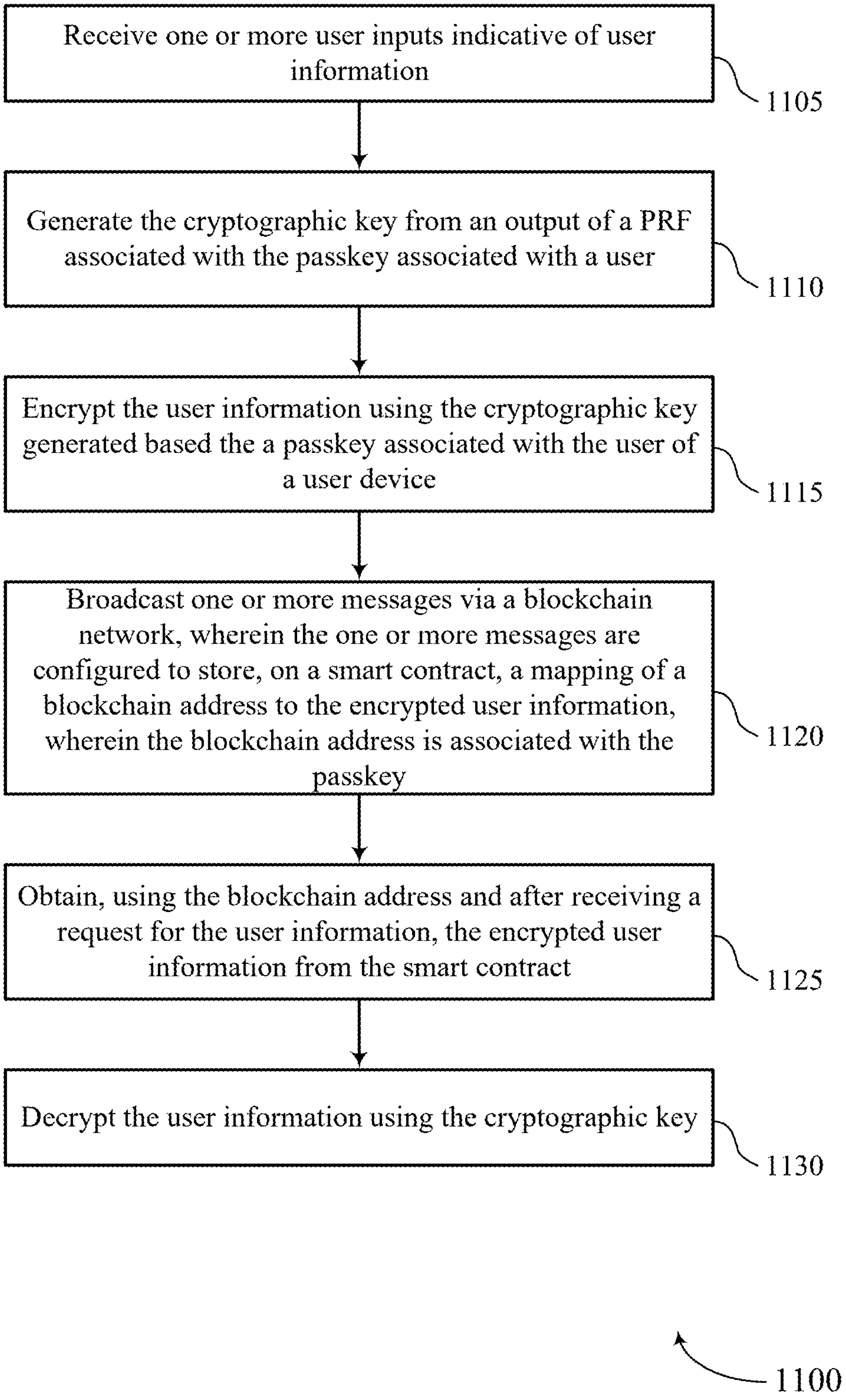

FIG. 11 shows a flowchart illustrating a method 1100 that supports blockchain address application user information management in accordance with aspects of the present disclosure. The operations of the method 1100 may be implemented by a blockchain address application or its components as described herein. For example, the operations of the method 1100 may be performed by a blockchain address application as described with reference to FIGS. 1 through 7. In some examples, a blockchain address application may execute a set of instructions to control the functional elements of the blockchain address application to perform the described functions. Additionally, or alternatively, the blockchain address application may perform aspects of the described functions using special-purpose hardware.

At 1105, the method may include receiving one or more user inputs indicative of user information. The operations of 1105 may be performed in accordance with examples as disclosed herein. In some examples, aspects of the operations of 1105 may be performed by a user information component 640 as described with reference to FIG. 6.

At 1110, the method may include generating the cryptographic key from an output of a PRF associated with the passkey associated with the user. The operations of 1110 may be performed in accordance with examples as disclosed herein. In some examples, aspects of the operations of 1110 may be performed by a key generation component 665 as described with reference to FIG. 6.

At 1115, the method may include encrypting the user information using a cryptographic key generated based on a passkey associated with a user of a user device. The operations of 1115 may be performed in accordance with examples as disclosed herein. In some examples, aspects of the operations of 1115 may be performed by an encryption component 645 as described with reference to FIG. 6.

At 1120, the method may include broadcasting one or more messages via a blockchain network, wherein the one or more messages are configured to store, on a smart contract, a mapping of a blockchain address to the encrypted user information, wherein the blockchain address is associated with the passkey. The operations of 1120 may be performed in accordance with examples as disclosed herein. In some examples, aspects of the operations of 1120 may be performed by a storage component 650 as described with reference to FIG. 6.

At 1125, the method may include obtaining, using the blockchain address and after receiving a request for the user information, the encrypted user information from the smart contract. The operations of 1125 may be performed in accordance with examples as disclosed herein. In some examples, aspects of the operations of 1125 may be performed by a blockchain operation component 630 as described with reference to FIG. 6.

At 1130, the method may include decrypting the user information using the cryptographic key. The operations of 1130 may be performed in accordance with examples as disclosed herein. In some examples, aspects of the operations of 1130 may be performed by a decryption component 655 as described with reference to FIG. 6.

A method by an apparatus is described. The method may include receiving, at a blockchain address application and from a client application, a request message comprising a payload for signature by a blockchain address associated with the blockchain address application and indicating requested user information to be provided to a collection endpoint associated with the client application, broadcasting, after receiving a user input executing the signature of the payload, one or more messages to a blockchain network and configured to execute an operation on the blockchain network, and transmitting, to the client application and using the collection endpoint, a response message comprising the requested user information and an identifier of the operation executed on the blockchain network.

An apparatus is described. The apparatus may include one or more memories storing processor executable code, and one or more processors coupled with the one or more memories. The one or more processors may individually or collectively be operable to execute the code to cause the apparatus to receive, at a blockchain address application and from a client application, a request message comprising a payload for signature by a blockchain address associated with the blockchain address application and indicating requested user information to be provided to a collection endpoint associated with the client application, broadcast, after receiving a user input executing the signature of the payload, one or more messages to a blockchain network and configured to execute an operation on the blockchain network, and transmit, to the client application and using the collection endpoint, a response message comprising the requested user information and an identifier of the operation executed on the blockchain network.

Another apparatus is described. The apparatus may include means for receiving, at a blockchain address application and from a client application, a request message comprising a payload for signature by a blockchain address associated with the blockchain address application and indicating requested user information to be provided to a collection endpoint associated with the client application, means for broadcasting, after receiving a user input executing the signature of the payload, one or more messages to a blockchain network and configured to execute an operation on the blockchain network, and means for transmitting, to the client application and using the collection endpoint, a response message comprising the requested user information and an identifier of the operation executed on the blockchain network.

A non-transitory computer-readable medium storing code is described. The code may include instructions executable by one or more processors to receive, at a blockchain address application and from a client application, a request message comprising a payload for signature by a blockchain address associated with the blockchain address application and indicating requested user information to be provided to a collection endpoint associated with the client application, broadcast, after receiving a user input executing the signature of the payload, one or more messages to a blockchain network and configured to execute an operation on the blockchain network, and transmit, to the client application and using the collection endpoint, a response message comprising the requested user information and an identifier of the operation executed on the blockchain network.

Some examples of the method, apparatus, and non-transitory computer-readable medium described herein may further include operations, features, means, or instructions for displaying, via a user interface of the blockchain address application, one or more fields corresponding to the requested user information and receiving, via the one or more fields of the user interface, one or more user inputs comprising the requested user information, wherein the response message comprises the requested user information based at least in part on the one or more user inputs.

Some examples of the method, apparatus, and non-transitory computer-readable medium described herein may further include operations, features, means, or instructions for storing the requested user information in a data store associated with the blockchain address application.

Some examples of the method, apparatus, and non-transitory computer-readable medium described herein may further include operations, features, means, or instructions for retrieving, using the blockchain address of the blockchain address application, the requested user information from a data store associated with the blockchain address application and that stores user information for a plurality of users, wherein the response message comprises the requested user information based at least in part on retrieving the requested user information from the data store.

Some examples of the method, apparatus, and non-transitory computer-readable medium described herein may further include operations, features, means, or instructions for displaying, via a user interface of the blockchain address application, the requested user information based at least in part on the requested user information being stored in a smart contract or a data store that may be accessible to the blockchain address application.

Some examples of the method, apparatus, and non-transitory computer-readable medium described herein may further include operations, features, means, or instructions for receiving, via a user interface, one or more user inputs approving sharing of the requested user information with the client application, wherein the response message may be transmitted in response to the one or more user inputs.

Some examples of the method, apparatus, and non-transitory computer-readable medium described herein may further include operations, features, means, or instructions for obtaining, in response to broadcasting the one or more messages to the blockchain network, a message hash for the operation, the message hash being the identifier of the operation executed on the blockchain network.

In some examples of the method, apparatus, and non-transitory computer-readable medium described herein, the response message may be transmitted in response to receiving the message hash for the operation.

Some examples of the method, apparatus, and non-transitory computer-readable medium described herein may further include operations, features, means, or instructions for encrypting the requested user information using a cryptographic key generated based on a passkey associated with a user of a user device and broadcasting one or more second messages via the blockchain network configured to store, on a smart contract, the smart contract comprising a mapping of a blockchain addresses to respective sets of encrypted user information.

Some examples of the method, apparatus, and non-transitory computer-readable medium described herein may further include operations, features, means, or instructions for obtaining, using the blockchain address associated with the blockchain address application and after receiving a request for the requested user information, an encrypted payload comprising the requested user information from a smart contract; and decrypting the requested user information using a cryptographic key associated with a user device that executes the blockchain address application.

In some examples of the method, apparatus, and non-transitory computer-readable medium described herein, broadcasting the one or more messages to the blockchain network may include operations, features, means, or instructions for broadcasting the one or more messages to the blockchain network and configured to execute a plurality of operations on the blockchain network including the operation.

In some examples of the method, apparatus, and non-transitory computer-readable medium described herein, the requested user information comprises an email address, a phone number, a shipping address, or any combination thereof.

In some examples of the method, apparatus, and non-transitory computer-readable medium described herein, the collection endpoint may be a URL.

A method by an apparatus is described. The method may include receiving one or more user inputs indicative of user information, encrypting the user information using a cryptographic key generated based on a passkey associated with a user of a user device, broadcasting one or more messages via a blockchain network, wherein the one or more messages are configured to store, on a smart contract, a mapping of a blockchain address to the encrypted user information, wherein the blockchain address is associated with the passkey, obtaining, using the blockchain address and after receiving a request for the user information, the encrypted user information from the smart contract, and decrypting the user information using the cryptographic key.

An apparatus is described. The apparatus may include one or more memories storing processor executable code, and one or more processors coupled with the one or more memories. The one or more processors may individually or collectively be operable to execute the code to cause the apparatus to receive one or more user inputs indicative of user information, encrypt the user information using a cryptographic key generated based on a passkey associated with a user of a user device, broadcast one or more messages via a blockchain network, wherein the one or more messages are configured to store, on a smart contract, a mapping of a blockchain address to the encrypted user information, wherein the blockchain address is associated with the passkey, obtain, using the blockchain address and after receiving a request for the user information, the encrypted user information from the smart contract, and decrypt the user information using the cryptographic key.

Another apparatus is described. The apparatus may include means for receiving one or more user inputs indicative of user information, means for encrypting the user information using a cryptographic key generated based on a passkey associated with a user of a user device, means for broadcasting one or more messages via a blockchain network, wherein the one or more messages are configured to store, on a smart contract, a mapping of a blockchain address to the encrypted user information, wherein the blockchain address is associated with the passkey, means for obtaining, using the blockchain address and after receiving a request for the user information, the encrypted user information from the smart contract, and means for decrypting the user information using the cryptographic key.

A non-transitory computer-readable medium storing code is described. The code may include instructions executable by one or more processors to receive one or more user inputs indicative of user information, encrypt the user information using a cryptographic key generated based on a passkey associated with a user of a user device, broadcast one or more messages via a blockchain network, wherein the one or more messages are configured to store, on a smart contract, a mapping of a blockchain address to the encrypted user information, wherein the blockchain address is associated with the passkey, obtain, using the blockchain address and after receiving a request for the user information, the encrypted user information from the smart contract, and decrypt the user information using the cryptographic key.

Some examples of the method, apparatus, and non-transitory computer-readable medium described herein may further include operations, features, means, or instructions for generating the cryptographic key from an output of a PRF associated with the passkey associated with the user.

In some examples of the method, apparatus, and non-transitory computer-readable medium described herein, the PRF may be enabled during authentication of a signature prior to receiving the one or more user inputs.

Some examples of the method, apparatus, and non-transitory computer-readable medium described herein may further include operations, features, means, or instructions for regenerating the cryptographic key based at least in part on the passkey associated with the user, wherein the user information may be decrypted after regenerating the cryptographic key.

Some examples of the method, apparatus, and non-transitory computer-readable medium described herein may further include operations, features, means, or instructions for transmitting an authentication challenge to the user device, the authentication challenge including a PRF and a salt used during generation of the cryptographic key and receiving, in response to the authentication challenge, a signature and an output of the PRF, wherein the cryptographic key may be regenerated using the output of the PRF.

In some examples of the method, apparatus, and non-transitory computer-readable medium described herein, and the method, apparatuses, and non-transitory computer-readable medium may include further operations, features, means, or instructions for encrypting the user information stored in a JSON object.

In some examples of the method, apparatus, and non-transitory computer-readable medium described herein, the user information comprises an email address, a phone number, a shipping address, or any combination thereof.

Some examples of the method, apparatus, and non-transitory computer-readable medium described herein may further include operations, features, means, or instructions for receiving, at a blockchain address application and from a client application, a request message comprising a payload for signature by the blockchain address associated with the blockchain address application and indicating that the user information is to be provided to a collection endpoint associated with the client application, wherein the encrypted user information may be obtained and decrypted after receiving the request message, broadcasting, after receiving a user input executing the signature of the payload, one or more second messages to the blockchain network and configured to execute an operation on the blockchain network, and transmitting, to the client application and using the collection endpoint, a response message comprising the user information and an identifier of the operation executed on the blockchain network.

In some examples of the method, apparatus, and non-transitory computer-readable medium described herein, the collection endpoint may be a URL.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method of data management, comprising:

receiving one or more user inputs indicative of user information;

encrypting the user information using a cryptographic key generated based on a passkey associated with a user of a user device;

broadcasting one or more messages via a blockchain network, wherein the one or more messages are configured to store, on a smart contract, a mapping of a blockchain address to the encrypted user information, wherein the blockchain address is associated with the passkey;

receiving, at a blockchain address application and from a client application, a request message comprising a payload for signature by the blockchain address associated with the blockchain address application and indicating that the user information is to be provided to a collection endpoint associated with the client application;

obtaining, using the blockchain address and after receiving the request message, the encrypted user information from the smart contract; and decrypting the user information using the cryptographic key.

2. The method of claim 1, further comprising:

generating the cryptographic key from an output of a pseudo-random function associated with the passkey associated with the user.

3. The method of claim 2, wherein the pseudo-random function is enabled during authentication of a signature prior to receiving the one or more user inputs.

4. The method of claim 1, further comprising:

regenerating the cryptographic key based at least in part on the passkey associated with the user, wherein the user information is decrypted after regenerating the cryptographic key.

5. The method of claim 4, further comprising:

transmitting an authentication challenge to the user device, the authentication challenge including a pseudo-random function and a salt used during generation of the cryptographic key; and receiving, in response to the authentication challenge, a signature and an output of the pseudo-random function, wherein the cryptographic key is regenerated using the output of the pseudo-random function.

6. The method of claim 1, wherein encrypting the user information comprises:

encrypting the user information stored in a JavaScript Object Notation (JSON) object.

7. The method of claim 1, wherein the user information comprises an email address, a phone number, a shipping address, or any combination thereof.

8. The method of claim 1, further comprising:

broadcasting, after receiving a user input executing the signature of the payload, one or more second messages to the blockchain network and configured to execute an operation on the blockchain network; and transmitting, to the client application and using the collection endpoint, a response message comprising the user information and an identifier of the operation executed on the blockchain network.

9. The method of claim 8, wherein the collection endpoint is a uniform resource locator (URL).

10. An apparatus, comprising:

one or more memories storing processor-executable code; and one or more processors coupled with the one or more memories and individually or collectively operable to execute the code to cause the apparatus to:

receive one or more user inputs indicative of user information;

generate a cryptographic key from an output of a pseudo-random function associated with a passkey associated with a user of a user device;

encrypt the user information using the cryptographic key generated based on the output of the pseudo-random function;

broadcast one or more messages via a blockchain network, wherein the one or more messages are configured to store, on a smart contract, a mapping of a blockchain address to the encrypted user information, wherein the blockchain address is associated with the passkey;

receive, at a blockchain address application and from a client application, a request message comprising a payload for signature by the blockchain address associated with the blockchain address application and indicating that the user information is to be provided to a collection endpoint associated with the client application;

obtain, using the blockchain address and after receiving the request message, the encrypted user information from the smart contract; and decrypt the user information using the cryptographic key.

11. The apparatus of claim 10, wherein the pseudo-random function is enabled during authentication of a signature prior to receiving the one or more user inputs.

12. The apparatus of claim 10, wherein the one or more processors are individually or collectively further operable to execute the code to cause the apparatus to:

regenerate the cryptographic key based at least in part on the passkey associated with the user, wherein the user information is decrypted after regenerating the cryptographic key.

13. The apparatus of claim 12, wherein the one or more processors are individually or collectively further operable to execute the code to cause the apparatus to:

transmit an authentication challenge to the user device, the authentication challenge including the pseudo-random function and a salt used during generation of the cryptographic key; and receive, in response to the authentication challenge, a signature and an output of the pseudo-random function, wherein the cryptographic key is regenerated using the output of the pseudo-random function.

14. The apparatus of claim 10, wherein, to encrypt the user information, the one or more processors are individually or collectively operable to execute the code to cause the apparatus to:

encrypt the user information stored in a JavaScript Object Notation (JSON) object.

15. The apparatus of claim 10, wherein the user information comprises an email address, a phone number, a shipping address, or any combination thereof.

16. The apparatus of claim 10, wherein the one or more processors are individually or collectively further operable to execute the code to cause the apparatus to:

broadcast, after receiving a user input executing the signature of the payload, one or more second messages to the blockchain network and configured to execute an operation on the blockchain network; and transmit, to the client application and using the collection endpoint, a response message comprising the user information and an identifier of the operation executed on the blockchain network.

17. The apparatus of claim 16, wherein the collection endpoint is a uniform resource locator (URL).

18. A non-transitory computer-readable medium storing code, the code comprising instructions executable by one or more processors to:

receive one or more user inputs indicative of user information;

encrypt the user information using a cryptographic key generated based on a passkey associated with a user of a user device;

broadcast one or more messages via a blockchain network, wherein the one or more messages are configured to store, on a smart contract, a mapping of a blockchain address to the encrypted user information, wherein the blockchain address is associated with the passkey;

receive, at a blockchain address application and from a client application, a request message comprising a payload for signature by the blockchain address associated with the blockchain address application and indicating that the user information is to be provided to a collection endpoint associated with the client application;

obtain, using the blockchain address and after receiving the request message, the encrypted user information from the smart contract;

regenerate the cryptographic key based at least in part on the passkey associated with the user; and decrypt, after regenerating the cryptographic key, the user information using the cryptographic key.

19. The non-transitory computer-readable medium of claim 18, wherein the instructions are further executable by the one or more processors to:

generate the cryptographic key from an output of a pseudo-random function associated with the passkey associated with the user.

20. The non-transitory computer-readable medium of claim 19, wherein the pseudo-random function is enabled during authentication of a signature prior to receiving the one or more user inputs.

* * * * *